Sept. 19, 1944.     N. G. CREAMER     2,358,447
BOTTLE CRATE FILLING MACHINE
Filed Jan. 16, 1941     10 Sheets-Sheet 1
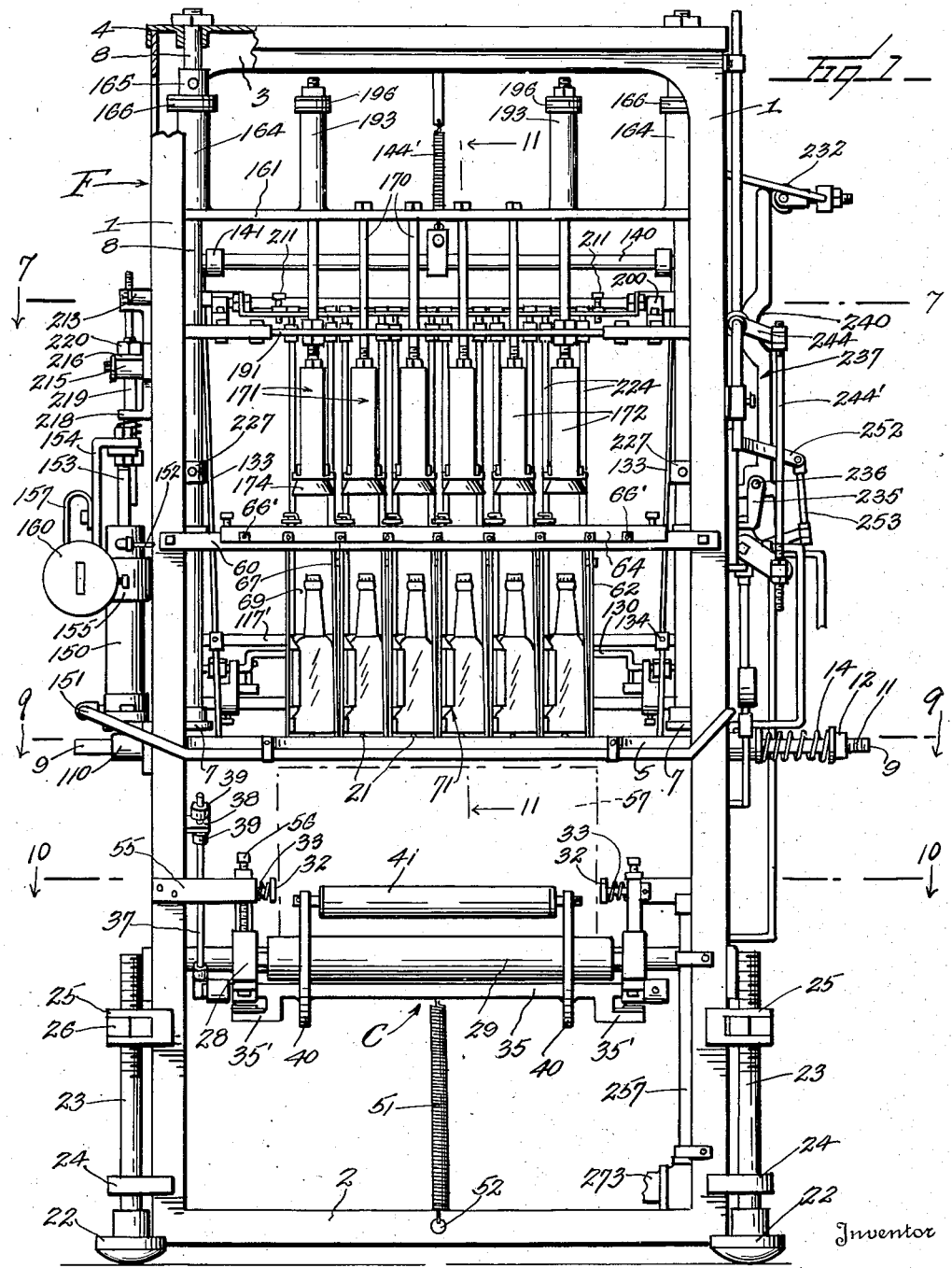
Inventor
Norman G. Creamer
By Watson E. Coleman
Attorney

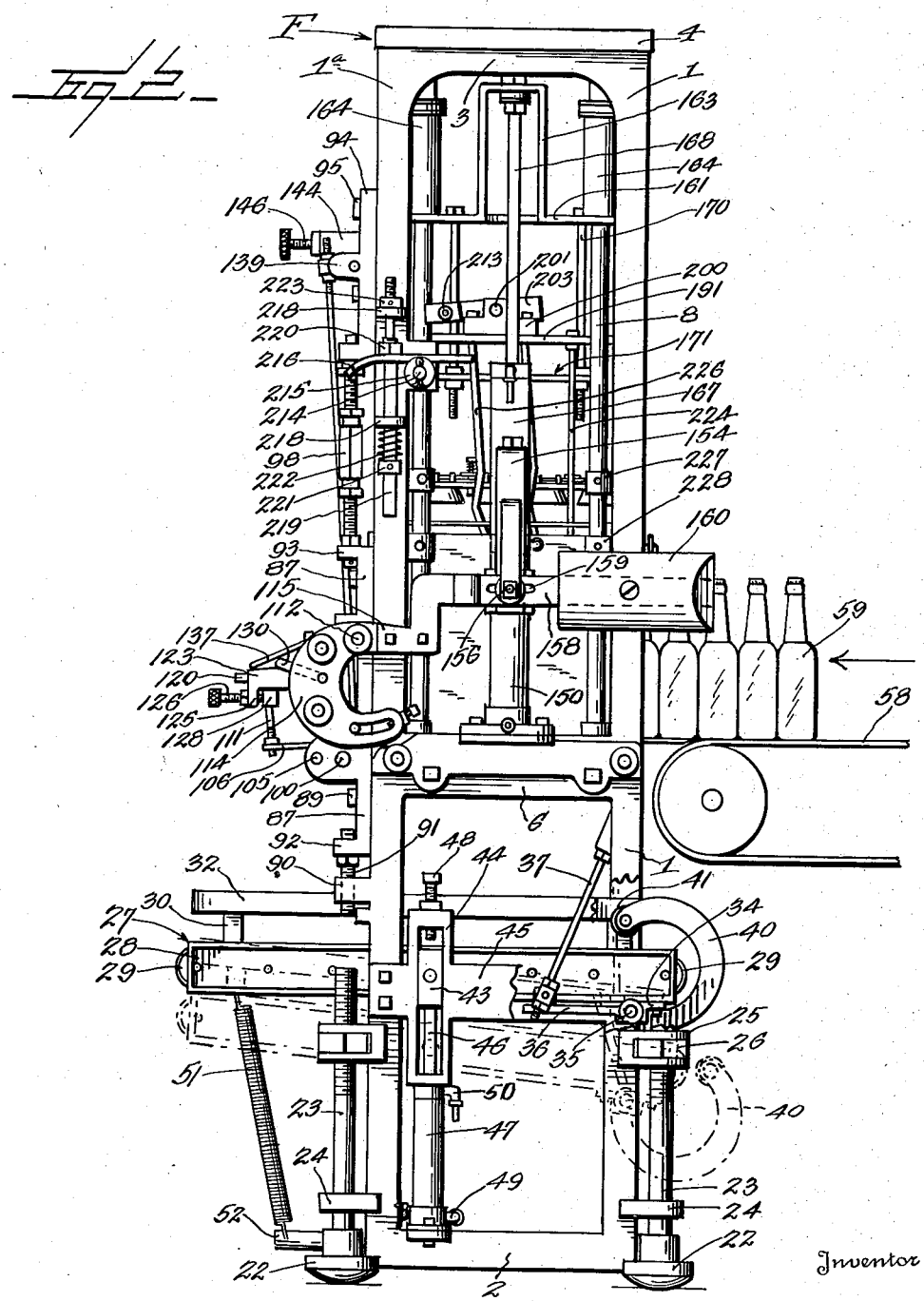

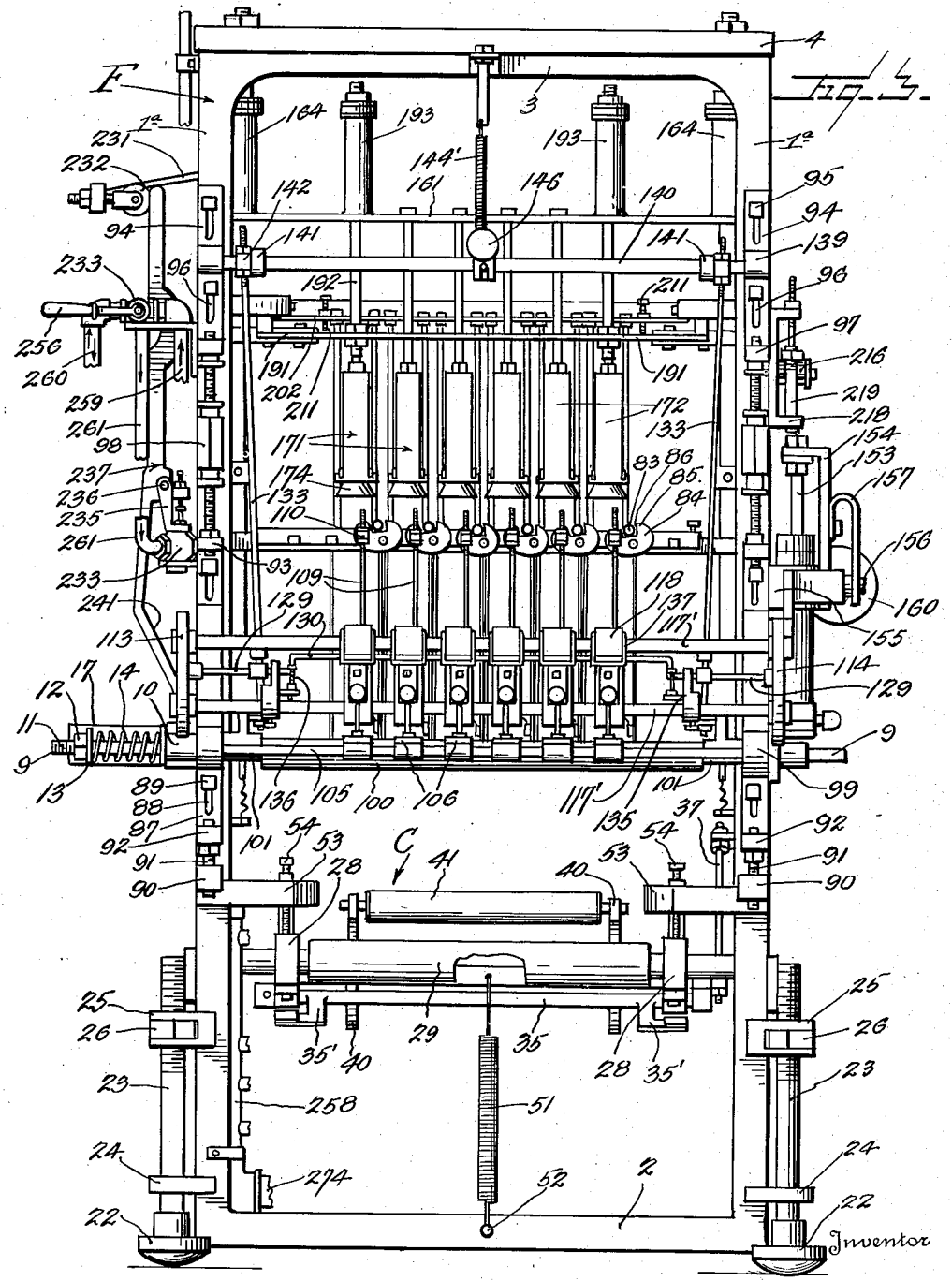

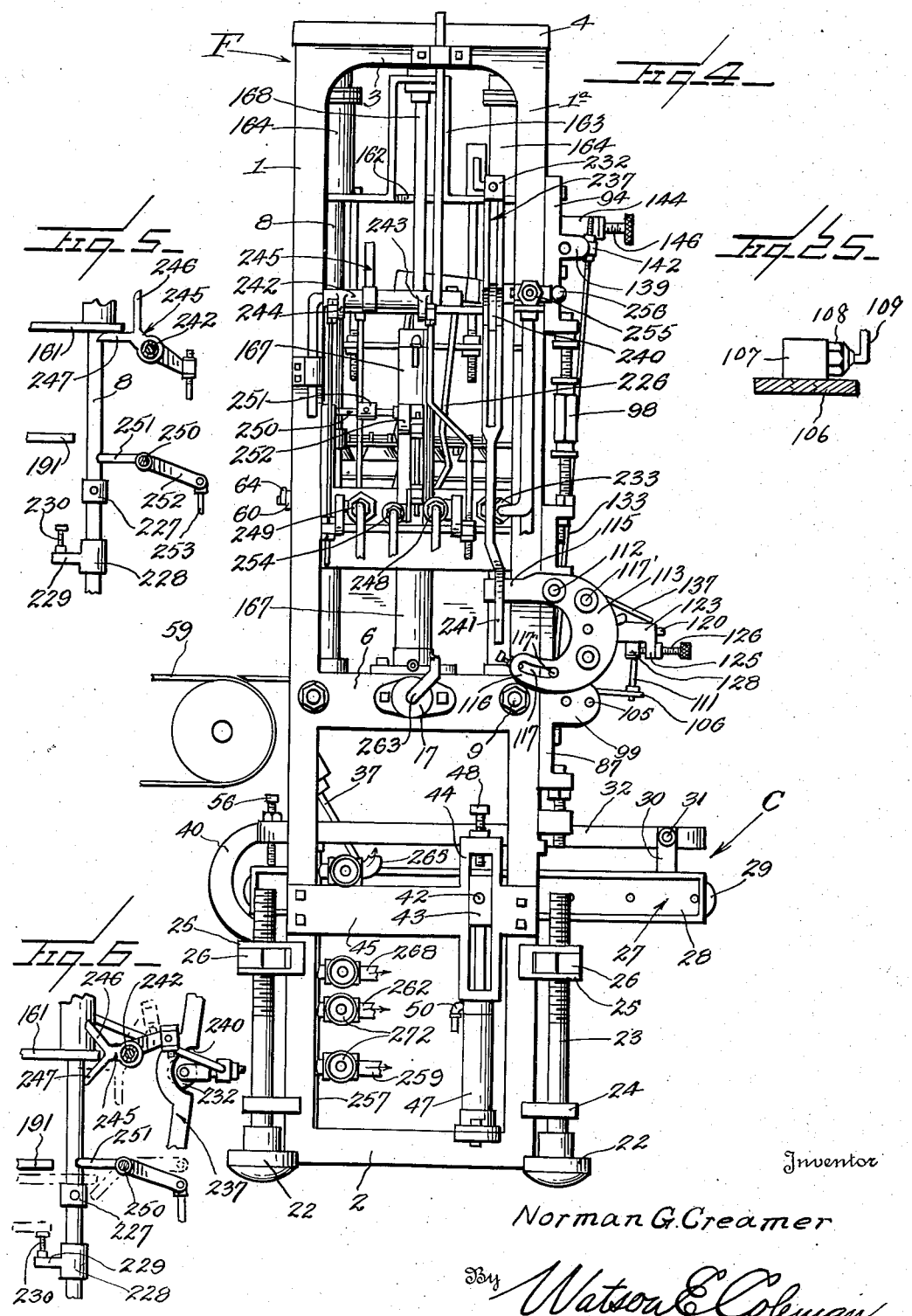

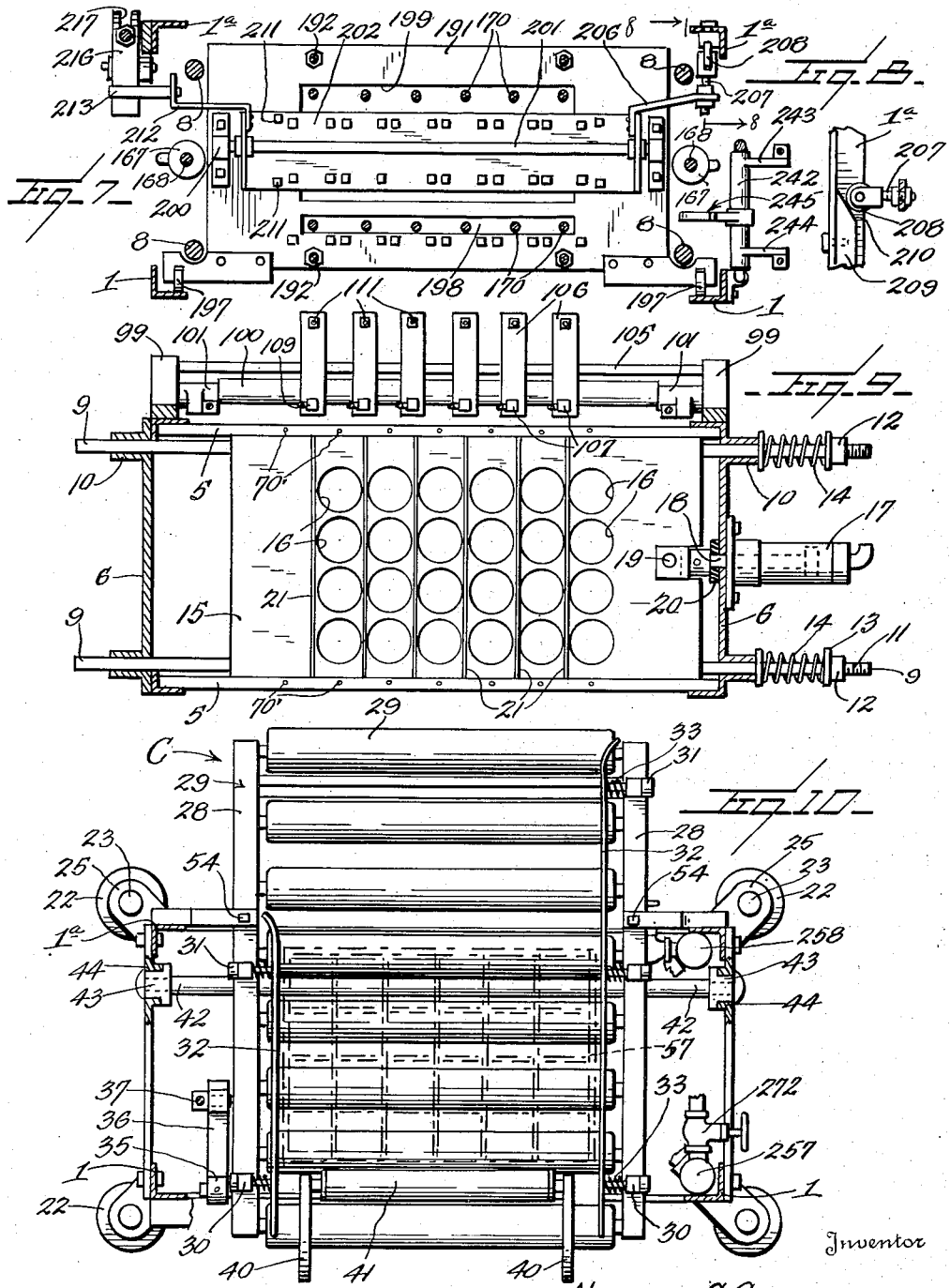

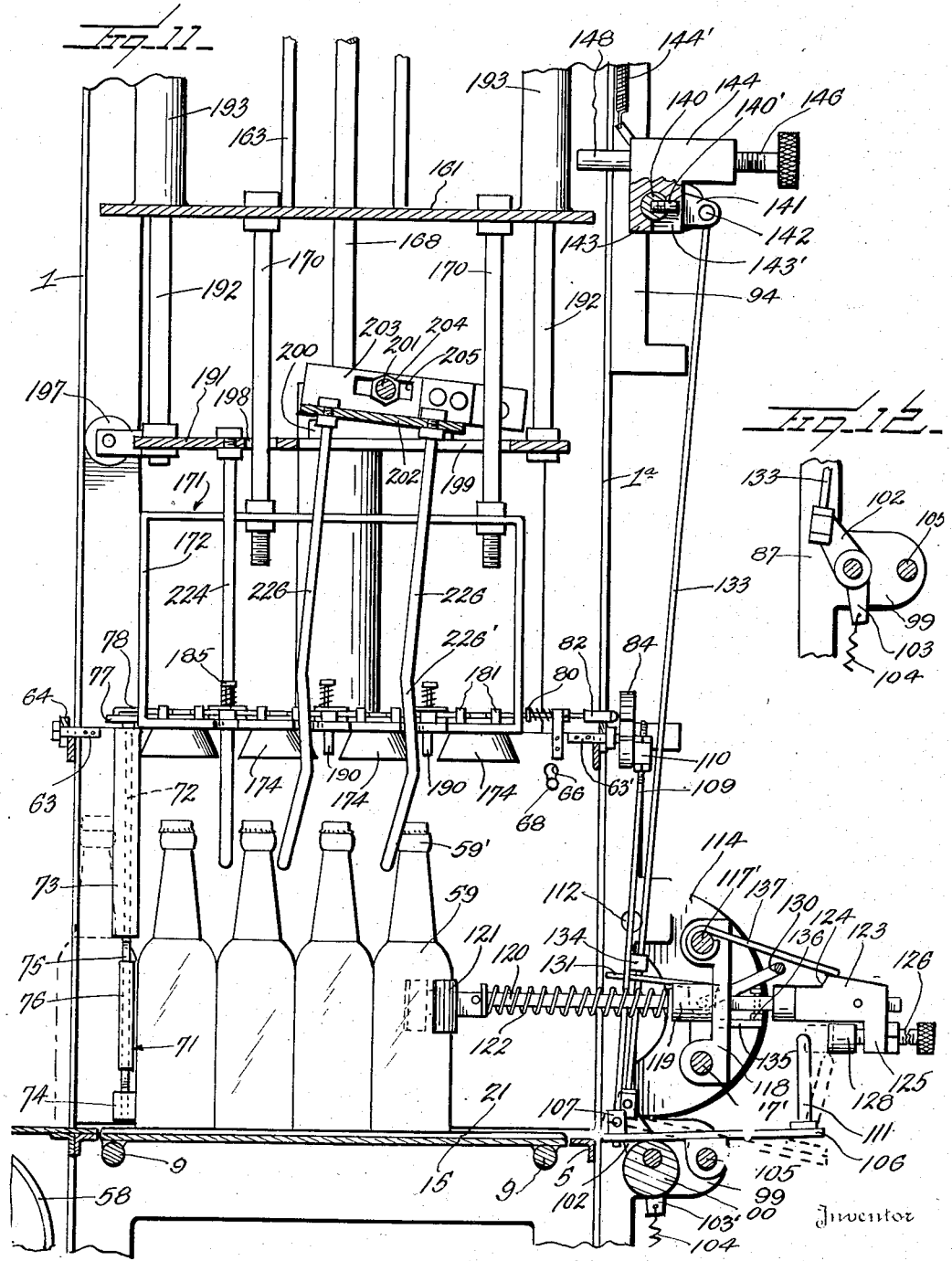

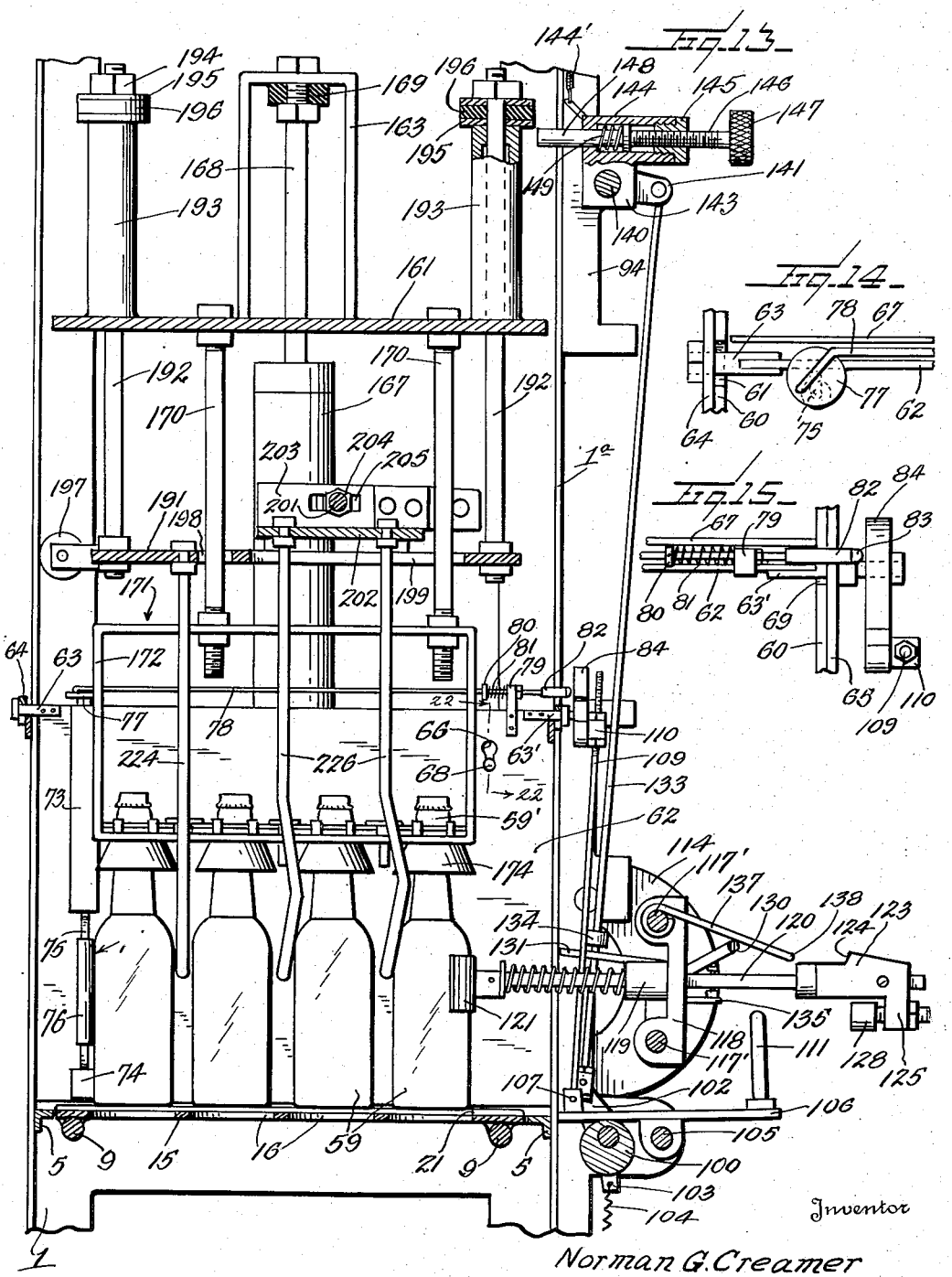

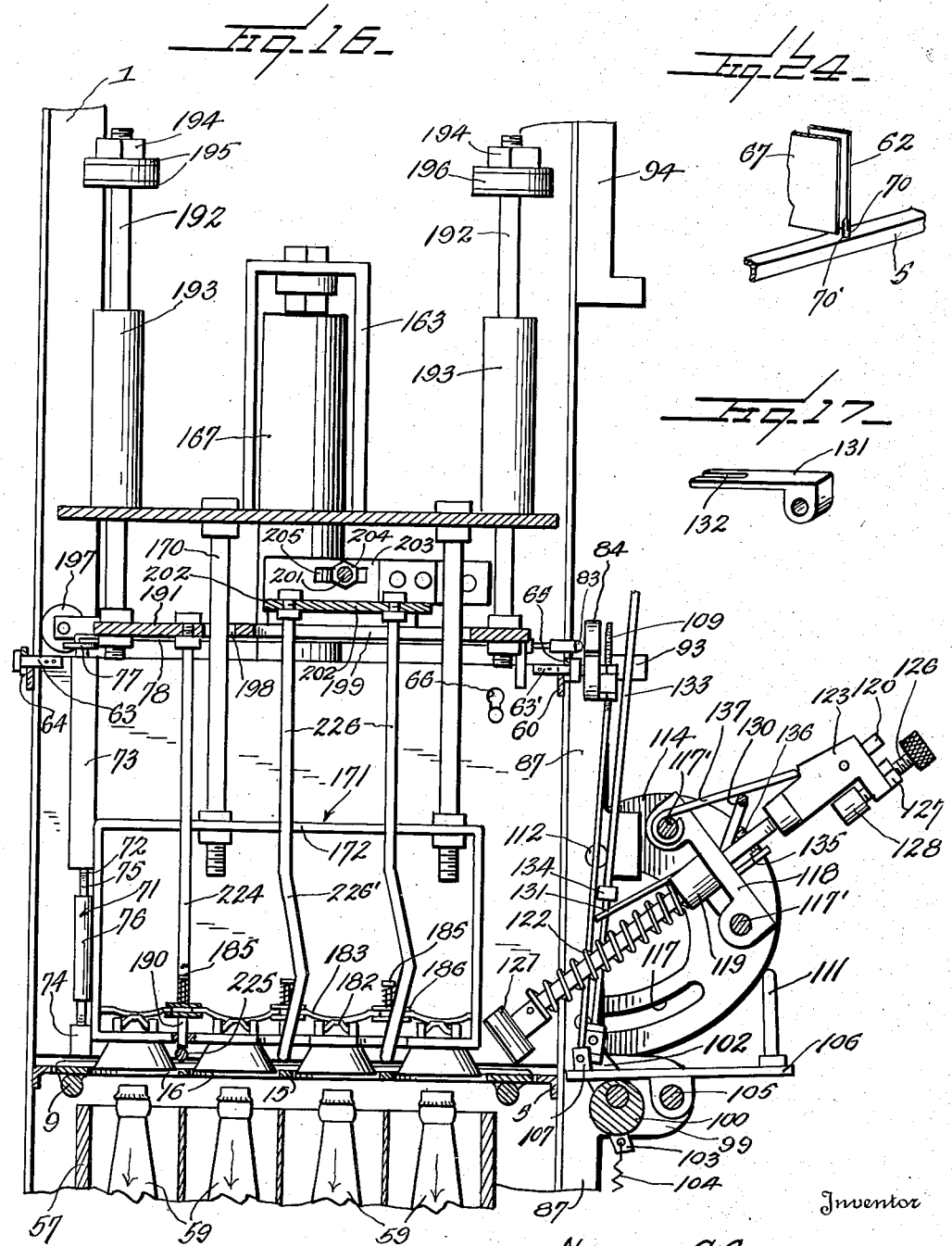

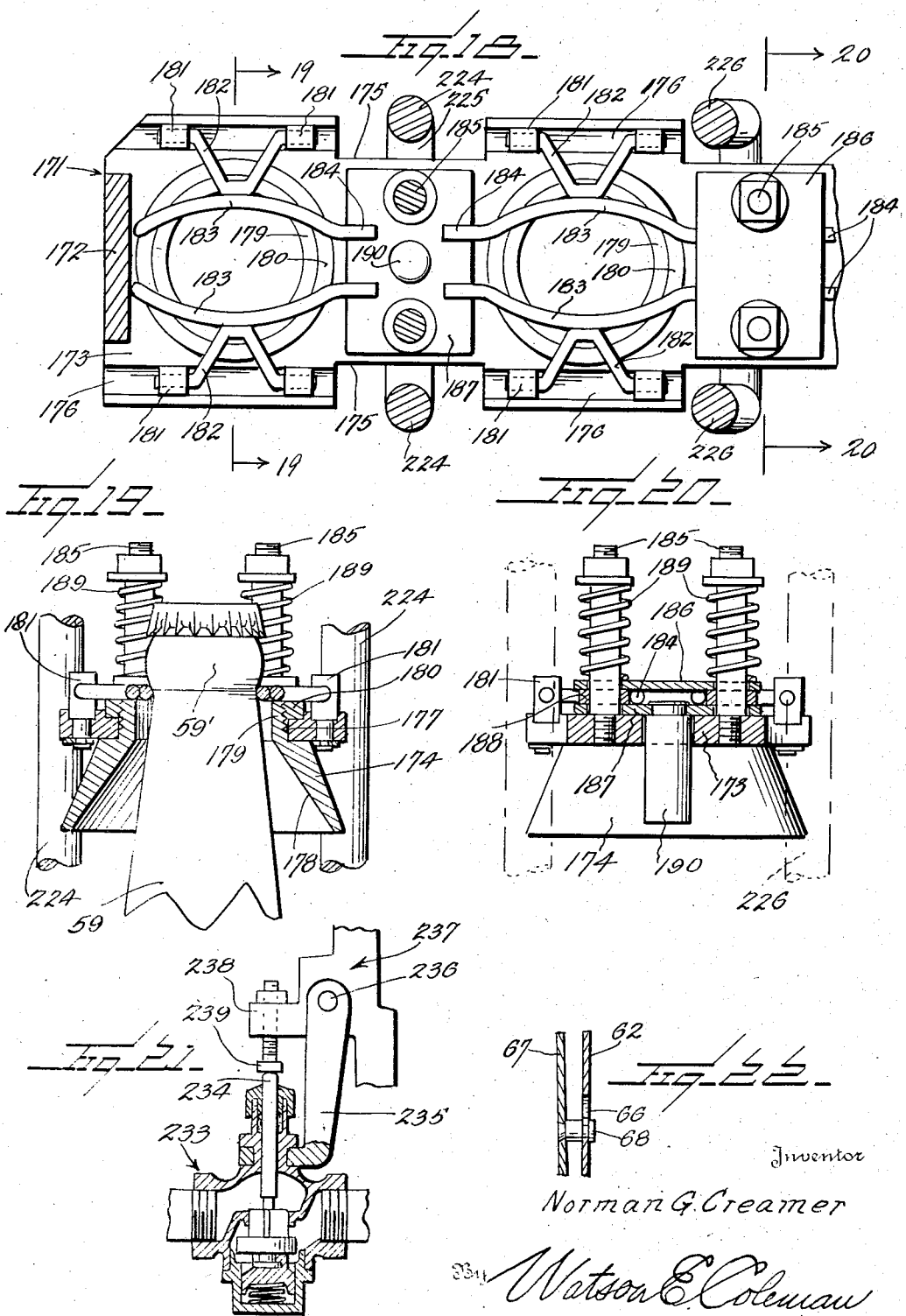

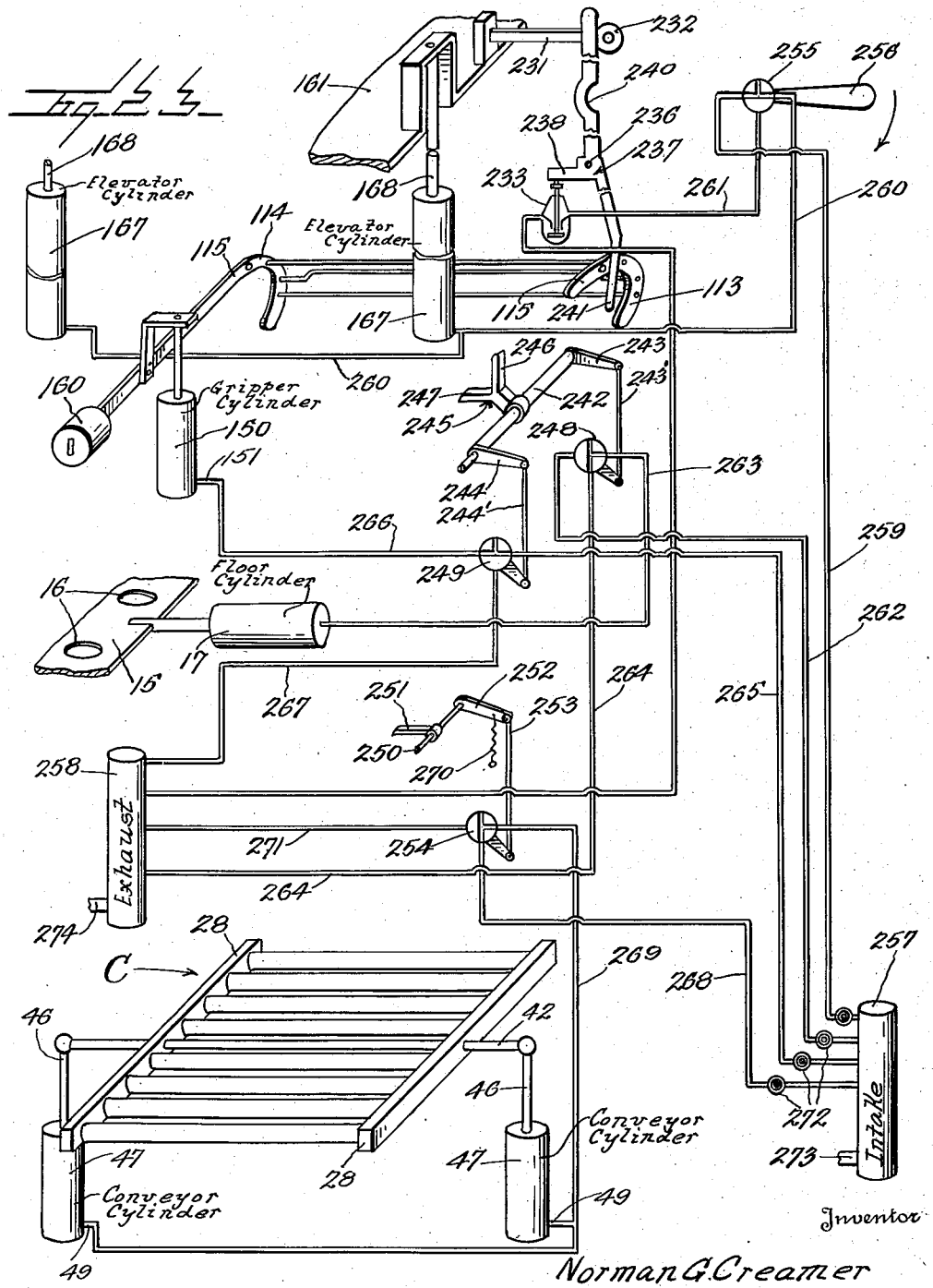

Patented Sept. 19, 1944

2,358,447

UNITED STATES PATENT OFFICE 2,358,447

BOTTLE CRATE FILLING MACHINE

Norman G. Creamer, Huntington, W. Va., assignor of forty-nine per cent to Austin L. Perry, Robert W. Sayre, and C. R. Schurman, all of Huntington, W. Va.

Application January 16, 1941, Serial No. 374,760

30 Claims. (Cl. 226—14)

This invention relates generally to the class of crating or boxing machines and pertains particularly to an improved machine for crating or boxing bottles of various types and designs.

A principal object of the present invention is to provide a bottle crating or boxing machine which is capable of handling bottles of various form or shape and of placing such bottles into boxes or crates, particularly crates having divisions or cells for the reception of the bottles. While it has been stated that the present machine is designed for boxing or crating bottles of all types or designs, it is especially designed for the purpose of handling bottled beer or other carbonated beverages.

In connection with the handling and distribution of carbonated beverages, particularly beer, it is very essential that the bottles be subjected to a minimum of jarring or jolting in order that the product may reach the consumer in its best condition. It is well known among manufacturers of bottled beer that after the beer has been bottled if the bottle is subjected to any violent agitation or jarring a certain proportion of the gas with which the beer is charged, either carbon dioxide or sulphur dioxide, is forced out of solution and collects at the top of the liquid in the neck of the bottle. This condition is characterized by the presence of foam upon the beer prior to the opening of the bottle. This gas after it has been jarred out of solution cannot be gotten back into solution in the liquid but remains beneath the cap of the bottle and as a consequence when the cap is removed this gas escapes and the beer when poured out into a glass will be found to be flat. It is, therefore, of utmost importance that in crating a product of this character particular care be exercised to prevent the unnecessary jolting or jarring of the bottles as they are placed in the crates. In bottling machines such as are at present used, no provision is made for preventing the dropping of the bottles into the crates without jolting or jarring, as a result of which the product is badly affected.

A particularly important object of the present invention, in view of the foregoing, is to provide a bottle crating or boxing machine which is so designed that it will introduce a number of bottles of beer or any other material into a receiving crate or box, as a group and with a minimum of jolting or jarring.

Another important object of the present invention is to provide in a bottle crating machine, a novel mechanism for assembling a number of bottles in a group over a receiving case or crate and simultaneously taking hold of all of the bottles of the group and lowering such bottles as a group into the crate and simultaneously releasing all of the bottles after the same have been lowered nearly to the bottom of the crate.

Still another object of the invention is to provide in a bottle crating machine of the character stated, a novel means of shifting or spacing the bottles after a group of the same has been assembled so as to facilitate the lowering of such bottles directly into individual receiving cells or compartments of a divided or celled crate without danger of jostling or jarring the bottles or of damaging labels thereon.

Still another object of the invention is to provide in a bottle crating machine, a novel bottle neck grasping or catching unit whereby bottles having crimped caps, such as beer bottles or the like, may be taken hold of and picked up by the bead which is commonly formed beneath the mouth of the bottle, and whereby such bead may be released at the proper time, without danger of striking the cap and loosening its grip upon the bottle mouth.

Still another object of the invention is to provide in a bottle crating machine of the character stated, a novel timing arrangement or assembly by means of which, after a predetermined number of bottles have been arranged in a desired group upon a supporting floor, there may be performed in the order stated the steps; of shutting off the admission of additional bottles to the floor; the spacing of the bottles on the floor whereby they may be properly located to be lowered directly through apertures in the floor into receiving cells of a crate; the grasping of all of the bottles simultaneously by the necks thereof by the previously referred to novel grasping means; the shifting of said floor immediately following the grasping of the bottles, to bring the apertures of the floor into position beneath the bottles; the lowering of the bottles as a group into the crate to a position in close proximity to the bottom of the crate; the release of the bottles when the same have been shifted to their lowermost position; and the removal or discharge of the crate from beneath the floor.

Still another object of the invention is to provide in a bottle crating machine of the character stated, receiving chambers into each of which a number of bottles is introduced and a novel means associated with each chamber whereby the admission of additional bottles beyond the previously determined number is automatically prevented.

Another object of the invention is to provide in a bottle crating machine of the character stated, a novel assembly of the several parts, including the control mechanism for the admission of bottles to the chambers, the bottle spacing mechanism and the bottle mouth or neck grasping mechanism, which will function to perform these various steps without danger of damaging labels or bottle neck wrapping.

A further object of the invention is to provide in a machine of the character stated, a novel centering means, cooperating with the bottle neck grasping mechanism which will function to guide the mouth portion or end of the bottle neck to the grasping mechanism so as to facilitate the operation of such grasping mechanism.

Numerous other objects and advantages of the present invention will become apparent as the description of the same proceeds and the invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Figure 1 is a view in front elevation of the machine.

Figure 2 is a view in elevation of the side of the machine upon which is mounted the control cylinder for the grippers.

Figure 3 is a view in elevation of the rear of the machine.

Figure 4 is a view in elevation of the other side of the machine from the gripper controlling cylinder.

Figure 5 is a fragmentary view detailing the position of the upper plate at the beginning of its engagement with the forked lever which controls the table shifting cylinder and the gripper shifting cylinder.

Figure 6 is a fragmentary view similar to Figure 5 but showing the upper plate in a slightly lower position and showing the relation of the parts with the means for controlling the quick acting spring valve which functions to momentarily check the downward movement of the head plates and heads.

Figure 7 is a horizontal sectional view taken substantially on the line 7—7 of Figure 1 and looking down upon the lower head plate and the oscillating plate which controls the movement of the bottle spacing arms.

Figure 8 is a detailed sectional view upon the line 8—8 of Figure 7.

Figure 9 is a horizontal section on the line 9—9 of Figure 1 taken below the vertical spacers and showing the detailed construction particularly of the bottle table or floor.

Figure 10 is a horizontal section taken on the line 10—10 of Figure 1 and showing in detail a top plan view of the crate support and conveyor.

Figure 11 is a sectional view on the line 11—11 of Figure 1, with the head unit moved partway on its downward stroke.

Figure 12 is a sectional view taken transversely of the supporting shaft for the eccentric roller by which the re-setting of the grippers is effected.

Figure 13 is a sectional view similar to Figure 11, but showing the heads and head plates in a still lower position on their downward movement and particularly illustrating the action of the bottle spacing arms.

Figure 14 is a view in top plan of one of the bottle operating eccentrics by which the entrance of the bottles into a receiver is controlled.

Figure 15 is a view in plan of the control mechanism which is directly connected with the eccentric of Figure 14 and which is located at the rear of the bottle receiver.

Figure 16 is a sectional view corresponding to or on the same line as Figure 11, but showing the heads and head plates in fully lowered position and illustrating the release of the bottles and also illustrating the out-of-the-way position to which the grippers have been moved.

Figure 17 is a perspective view of one of the trip fingers connected with the latch releasing mechanism associated with the grippers.

Figure 18 is a detailed top plan view on an enlarged scale of a pair of bottle grippers and showing in transverse section two adjacent bottle spacers.

Figure 19 is a sectional view on the line 19—19 of Figure 18.

Figure 20 is a sectional view on the line 20—20 of Figure 18.

Figure 21 is a detailed sectional view of the quick acting spring valve by which the lowering of the bottle carrying heads is momentarily checked.

Figure 22 is a sectional view on the line 22—22 of Figure 13.

Figure 23 is a schematic view or diagram of the fluid system by which the operation of the machine is controlled, showing in association therewith parts of units connected with the cylinders.

Figure 24 is a detailed perspective view of a corner portion of a permanent partition plate and the supplemental plate adjacent thereto showing the connection of the permanent plate with the adjacent floor rail.

Figure 25 is a detailed view illustrating the connection between a teeter finger and the rod connecting the same with a timer cam.

Referring now more particularly to the drawings, the machine will be described by setting forth first the general frame construction and then by describing in detail the various units which go to make up the complete machine by means of which the bottle crating operation is carried out.

The machine as here illustrated is shown to comprise a main frame, indicated generally by the character F. This frame, as shown, is of open design and includes the upright front and rear corner posts 1 and 1ᵃ respectively, which are connected with a base unit 2 and which are joined together at their upper ends by the top frame 3. This top frame is covered by a head plate 4.

Above the bottom of the frame there are secured the horizontal front and rear floor rails 5 and in the same plane with these floor rails there extend across the sides of the frame the side rails 6.

Extending inwardly above each side rail and from the front to the rear of the machine is a narrow horizontal plate 7 and secured to each of these plates 7 at each end thereof is a vertical main guide 8 which passes upwardly to and through the top 4 of the machine frame, as is shown in Figure 1. As shown in Figure 7, each of these guides 8 is disposed upon the inner side of one of the vertical corner uprights of the frame.

Extending across the machine frame at the front and at the rear thereof and along the inner side of each floor rail 5 is a slide bar 9 and these slide bars extend through guide bearings 10, Figure 9, which are integral with the floor side rails 6. Upon one side of the machine, here shown as the right side, each of the slide bars 9 is screw threaded, as indicated at 11, to receive a nut 12 and between the nuts 12 and the adjacent bearing guides 10 the slide bars carry washers 13 between which are interposed expansion springs 14.

Disposed horizontally within the frame between and in the plane of the floor rails 5 is a floor plate 15 which plate is provided with a plurality of apertures 16 which, as shown in Figure 9, are arranged in groups extending in a line transversely of the plate. In the particular floor plate here shown there are six groups of apertures with four apertures to each group as the machine here illustrated is set up for the handling of bottled beer which are twenty-four to the case. It will be understood, however, that various floor plates may be employed having different numbers of apertures according to the type of commodity being handled. Thus, if the machine is to be employed for crating bottles of milk, which are twelve to the case, then the floor plate would be provided with four groups of apertures with three apertures to the group.

This floor plate 15 is mounted on and secured to the pair of horizontally disposed spaced parallel slide bars 9 so that it will be seen that when the floor is shifted transversely of the machine, in one direction, the springs 14 will be compressed and when the springs are permitted to react they will move the floor back toward the right of the machine to its initial position.

The movement of the floor against the tension of the springs 14 is accomplished in the present machine by fluid pressure and for the carrying out of this operation there is provided, preferably upon the right side of the machine, the piston cylinder 17 which is mounted horizontally upon the adjacent side rail 6 with its axial center in the plane of the floor. Within the cylinder is a piston with which is connected a stem 18 and this stem passes through the side rail 6 to the adjacent end edge of the floor to which it is attached, as indicated at 19.

A bumper 20 encircles the piston stem and is interposed between the inner side of the adjacent side rail 6 and the free end of the stem so as to absorb the shock incident to the return of the floor 15 to its starting position by the springs 14.

Upon the top of the floor 15 and extending transversely thereof, that is from the front to the rear, are track rails 21, each rail passing between two groups of the apertures 16, as shown in Figure 9. The purpose of these rails will be more fully set forth in the following description of the operation of the machine.

In order that the machine may be properly leveled when set up for use there are provided the feet 22 which are located one at each corner of the frame and each of which is provided with a vertical post 23 which passes through guides 24 and 25 which are integral with the corner posts of the frame. The guides 25 are recessed to receive nuts 26 and the upper ends of the feet posts are screw threaded for threaded engagement in these nuts and from this it will be readily apparent that by turning the nuts 26 in the recessed guides, the foot post with which the nut is connected will be shifted relatively to the guides and will, therefore, raise or lower the adjacent corner of the frame.

*Case conveyor mechanism*

The case conveyor mechanism is indicated as a whole by the reference character C. This mechanism is located beneath the floor 15 and receives the bottle case and supports it in the proper position beneath the floor to receive the bottles as a group as they are lowered through the openings of the floor in the manner hereinafter described. The case conveyor comprises a roller frame, indicated generally by the numeral 27, and made up of the two side rails 28 between which are rotatably supported the rollers 29. These rails 28 extend through the lower part of the frame from the front to the rear and, as shown in Figures 2 and 4, the roller frame extends a greater distance beyond the rear side of the machine than beyond the front. This provides for the easy transfer of a crate either from a suitable conveyor, not shown, or from the hands of an operator, to the case conveyor. At each side of the frame 27 the rails 28 support short upright members 30 which carry horizontal inwardly extending pins 31, which pins are supported for sliding movement through the members 30 and upon their inner ends these pins support guide rails 32 which extend lengthwise of the conveyor and overlie the ends of the adjacent rollers, as is shown most clearly in Figure 10. Between the guide rails 32 and the supporting members 30 are springs 33 which normally urge the guide rails inwardly but which may yield when a case is run onto the conveyor if such case comes into contact with the guide rail. As shown in Figure 10, one of the guide rails 32 is of greater length than the other, the shorter guide rail terminating at its rear end short of the rear of the conveyor frame 27, while the longer rail extends the full length of the conveyor frame. This permits of the easy disposal of a case on the conveyor rollers.

At the front end of the conveyor frame 27, each side rail 28 supports upon its underside a bearing 34 and these bearings support a rock shaft 35 which extends across the frame 28. This rock shaft at one end has secured thereto a lever arm 36 which, as shown in Figure 2, extends rearwardly at the side of the frame. To the rear end of this lever arm is pivotally coupled one end of a link rod 37 which has its upper end extended through a bracket 38 which is attached to the inner side of the corner upright I of the frame. This link carries the spaced nuts 39 disposed one above and the other below the bracket and the link has rocking movement through the bracket 38 in the manner and for the purpose hereinafter set forth.

The rock shaft 35 has secured thereto the ends of two substantially semi-circular arms 40, which extend in a direction transversely of the adjacent conveyor roller 29 and which have their concave sides directed toward such roller. The other ends of the two arms 40 have rotatably supported therebetween a jump roller 41. With this construction it will be readily seen upon reference to Figure 2 that when the rock shaft 35 is turned in the proper direction, the arms 40 will swing upwardly and inwardly toward the adjacent end roller 29 of the conveyor and will swing the jump roller 41 to a position above the conveyor rollers where it will function as a stop for a crate run on the conveyor and when the rock shaft is turned in the opposite direction the jump roller will be swung forwardly and downwardly to a position in the plane of the rollers 29 so that a crate may move smoothly off of the conveyor.

When the rock shaft 35 turns in the direction to swing the jump roller 41 to the lowered position in which it is shown in dotted outline in Figure 2, the turning of the shaft is limited by stops 35' which are in the form of finger members carried by the shaft and extending downwardly and laterally under the adjacent side rail 28 of the conveyor frame. These fingers swing up toward and engage the underside of the adjacent conveyor frame rail when the jump roller is lowered and in this way limit the downward swinging movement of this element.

The conveyor frame 29 is supported for up and down movement and also for rocking movement on an axis extending transversely of the machine. This frame is supported for such rocking movement by the shaft 42 which extends transversely of the frame through the side bars 28 thereof. The outer ends of this shaft 42 are rockably mounted in bearing blocks 43 and these blocks are maintained for vertical sliding movement in the vertical guides 44 which are located at the opposite sides of the machine frame and secured to the adjacent front and rear uprights 1 and 1ª by means of the horizontal plate 45. Each bearing block 43 constitutes a cross-head which is connected with the rod 46 of a piston, not shown, which is housed within a vertical fluid cylinder 47 mounted in a suitable manner upon the base of the machine, as shown in Figures 2 and 4. At the upper end of each of the guides 44 a stop screw 48 is located which governs the vertical movement of the adjacent bearing block 43.

The lower end of each of the conveyor lifting cylinders 47 has connected therewith the fluid inlet nipple 49 through which fluid is introduced for the raising of the conveyor in the manner hereinafter described.

In Figures 2 and 4 the cylinders 47 are shown as having drain pipes 50 leading from the upper ends thereof. These pipes are provided merely for the purpose of exhausting from the cylinders any fluid which may work past the pistons, so that such fluid will not interfere with the movements of the pistons to the tops of the cylinders.

The conveyor frame is mounted off center on the shaft 42 so that when it is lowered by the process of draining or exhausting the fluid from the cylinders 47, the forward end of the conveyor, which is the end at which the jump roller is located, will swing down lower than the rear end and, therefore, the bottle crate which is supported upon the conveyor will move by gravity off of the forward end thereof. The downward swinging of the forward end of the conveyor is limited by the link 37 so that two functions are accomplished by this link, which are that when the forward end of the conveyor frame swings down the link will rock the rock shaft 35 to swing the jump roller out of position and the link will also limit the downward swinging movement of the front end of the conveyor.

At the rear end of the conveyor a check spring 51 has one end connected with the conveyor while its other end is connected to an arm 52 which extends rearwardly from the base 2 of the machine, as shown in Figure 2. This spring functions when the conveyor is being raised by fluid in the pistons 47 to check the upward movement of the rear of the conveyor and tend to swing it toward the horizontal position to which it is finally moved by engagement with limiting stops hereinafter described.

Each of the rear corner posts 1ª of the frame carries an inwardly extending finger 53 which has threaded vertically therethrough a stop screw 54 which is disposed directly over a side rail 28 of the conveyor frame, as shown in Figure 3. One of the front corner uprights 1 of the frame also carries an inwardly extending finger which is indicated by the numeral 55 in Figure 1, and this finger carries a vertical threaded stop screw 56 which is disposed above the adjacent side frame 28 of the conveyor. These stop screws 54 are adjusted so that their lower ends will all be in one horizontal plane and they function to check the upward movement of the conveyor when fluid is introduced into the cylinders 47 and also to swing the conveyor into horizontal position. When the conveyor is in this raised horizontal position, in which position it is held by fluid in the piston cylinders 47, it will support a crate directly beneath the machine floor 15 with the top of the crate in close proximity to the floor, as is shown in Figure 1, where a crate is illustrated in broken lines and indicated generally by the numeral 57.

It will, of course, be understood that in the case of bottling beer where a floor having twenty-four apertures is employed, the crate will have twenty-four bottle receiving compartments or cells and when the crate is in the position shown in Figure 1 upon the raised conveyor, with its forward end against the jump roller 41, each of the bottle receiving cells of the crate will be directly beneath an opening 16 of the floor.

*Bottle grouping and timer mechanism*

In Figure 2 there is conventionally illustrated a means for delivering bottles onto the floor of the machine, this means being here illustrated as comprising an endless conveyor 58 on which the bottles 59 are carried toward the front of the machine. The top of the conveyor on which the bottles rest is in the plane of the tops of the tracks 21.

Disposed above each of the floor rails 5 is a partition supporting rail 60 which is secured to and carried by the corner uprights of the frame, as shown in Figure 1. Each of these rails is provided with notches or recesses 61 in its top edge, as shown in Figure 14. There are seven of these notches in each of the bars 60 which notches vary in width from the central one to the outer end ones. There are also seven partition plates each of which is indicated by the numeral 62 and each of these partition plates has secured at the top thereof the horizontal front and rear suspension pins 63 and 63' respectively, with extend beyond adjacent vertical edges of the plates as is shown in Figures 13 and 16. The partition plates extend from the front to the rear of the machine and all of the pins 63 at the front edges of the partition plates extend through and are connected with a front coupling bar 64, while all of the suspension pins which extend from the rear edges of the partition plates extend through and are secured to a rear coupling bar 65. Thus, it will be seen that all of the partition plates are joined together in spaced parallel relation by the coupling bars 64 and 65 and these coupling bars are disposed against the outer sides of the bars 60 and are suitably secured thereto by the screws 66', Figure 1. When the coupling bars 64 and 65 are in this position, the suspension pins 63 will be located in the notches 61 in the top edges of the bars 60. By providing the central one of the notches 61 of just sufficient size to receive the suspension pin of the central partition plate and by providing the other notches of varying width, it will be apparent that different groups of partitioning plates may be employed in which the spaces between the plates vary. As an example, if it is desired to use a group of seven partitioning plates having a wider space between them than exists between the partitioning plates already in the machine, the new group can be placed in position and the central suspension pins for the central plate will occupy exactly the same position as was occupied by the pins of the previous plate but the other pins of the new group of plates will be in a different position in their respective slots than were the corresponding pins of the plates of the first group.

Where there are employed crates having relatively thin partition walls such, for example, as corrugated board boxes, it is only necessary to use the single partitioning plates 62. However, in the use of wooden crates where the partitions are relatively thick, it is desirable that the partitioning walls of the machine between which the groups of bottles are discharged from the conveyor 58, be of greater thickness so as to avoid any possibility of the bottles contacting the cells or partitions of the crate as the bottles are lowered thereinto. For this reason six of the seven permanent partition plates 62 are provided each adjacent its top edge with two key hole slots 66 and there is provided for each of these six permanent partition plates, a supplemental plate 67 which carries a pair of buttons 68 for engagement in the key hole slots 66 of the associate permanent partition plate so that each of the supplemental plates will be suspended, as shown in Figure 1, in side by side relation with a permanent plate.

The supplemental plates converge slightly toward their lower edges with the adjacent permanent partition plate to facilitate the operation of the hereinafter described timers which are mounted upon the inner faces of certain of the permanent partition plates and which control the admission of bottles to the receiving areas 69 which are formed by the partitions. These receiving areas extend transversely of the floor and are arranged so that the bottles as they are moved forward by the conveyor 58 will be forced into the receiving areas.

When the floor 15 is in starting or initial position, each of the tracks 21 will lie directly in the middle of each receiving area or midway between a pair of partitions. Thus, it will be seen that as the bottles 59 move off of the conveyor 58 into the receiving areas 69 they will ride onto a track 21. The apertures of the floor will, of course, be out of position with respect to the areas into which the bottles are received and, therefore, the bottles will remain in these areas until the floor is shifted.

In order to maintain the partitions in place at their lower edges, each of the permanent plates 62 is provided with a depending bottom edge pin 70 which engages in an aperture 70' in the adjacent and underlying floor rail 5.

The admission of the bottles to the receiving areas 69 between the partitions is controlled by timers 71 which are located at the entrance of each receiving area upon one of the adjacent permanent partition plates 62. Each of these timers comprises a rock shaft 72 which is supported between its ends in upper and lower bearings 73 and 74 respectively, which are mounted upon the inner side of the supporting partition plates 62. Adjacent the lower part of the supporting plate, the rock shaft is provided with an offset portion 75 and encircling this offset portion is a roller 76 against which the bottle is forced as it enters the receiving area. The bottle, therefore, effects partial turning of the rock shaft and this produces a partial rotation of a disk 77 which is mounted upon the upper end of the rock shaft, as is clearly shown in Figures 14 and 16.

Each of the disks 77 functions as a crank to effect the reciprocation of a reciprocable rod 78 which has one end eccentrically connected with the disk 77, as shown in Figure 14, and as is shown in Figure 13, has its other end slidably supported in a guide 79 which is secured to the top edge of the adjacent permanent partition plate 62 adjacent the rear of the same. A collar 80 is secured to the reciprocable rod 78 and between this collar and the adjacent guide an expansion spring 81 is interposed which normally tends to shift the rod 78 forwardly.

Upon the rear end of each of the reciprocable timer rods 78 there is carried a head 82 which has a ball tip 83. The suspension pins 63' which are connected with the plates which support the reciprocable timer rods 78, each supports a timer cam 84 for rocking movement on the pin. Each of these timer cams, as shown in Figure 3, has a point 85 and a cut-out portion or recess 86. When the timer cams are in the starting position for the machine the points 85 will be out of alinement with the heads 82 of the reciprocable rods and, therefore, the rock shafts 72 may be freely oscillated each time a bottle passes the roller 76 in entering the receiving space. However, when the timer cam 84 is oscillated to bring the point 85 across the end of the adjacent head 82, then reciprocable movement of the rod 78 is stopped.

Disposed vertically against the rear side of each rear upright 1ª of the frame is a vertically adjustable support 87 which, as shown in Figure 3, is provided with a pair of longitudinal slots 88 through which extend guide bolts 89 which are secured in the adjacent corner upright of the frame. Below each of these supports is a fixed ear 90 with which is threadably secured a bolt 91 which, at its upper end, is swivelly coupled with an outturned terminal portion 92 of the adjacent support. At the upper end of each of these supports is a similar outturned portion 93. Also secured to each of the corner uprights 1ª of the frame above the support 87 is a bearing support 94 which has vertical adjustment on the frame through the medium of the bolts 95 carried by the frame and extending through the slots 96 of the bearing support. The lower end of each of these bearing supports has an outturned terminal portion 97 and these portions 97 are connected by the turnbuckle units 98 which are employed for obtaining desired adjustment between the supports 87 and the overlying supports 94. The lower supports 87 may be raised and lowered as will be readily apparent by means of the screws 91.

Each of the supports 87 carries a bearing ear 99 and these ears are in alinement transversely of the rear of the machine and support the ends of a rocking cam bar 100 which is supported at the rear of the machine substantially in the plane of the floor 15. At the ends of this cam bar are fixed sleeves 101, each of which carries an upwardly extending ear 102 and a downwardly extending ear 103. Each of the downwardly extending ears 103 has connected therewith an end of a contractile spring 104 which is attached to an adjacent fixed part of the machine frame and these springs normally tend to rock the cam bar 100 to a position where the low side of the cam is uppermost.

Supported in parallel relation with the cam bar, with its ends rockably mounted in the ears 99, is a rocking teeter bar 105. Supported upon this teeter bar is a series of teeter fingers 106 each of which rests at its transverse center on the bar 105, as shown in Figure 9. These teeter fingers correspond in number with the bottle receiving spaces 89 and each is disposed to extend on the longitudinal center of a receiving space at the rear of such space, as Figure 9 clearly illustrates.

At the forward end of each teeter finger there is secured to the top of the finger a bearing stud 107 and each of these studs carries a ball and socket connection 108 by which is coupled to the stud and to the teeter finger the vertical rod 109 which, at its upper end, is adjustably connected, as indicated at 110, to a timer cam upon the side of the pivot thereof opposite from the point of the cam. This connection between the timer cam actuating rods 109 and the timer cams 84 is most clearly shown in Figure 3.

Upon the rear of each teeter finger is a vertically extending stop pin 111, the purpose of which will be hereinafter described.

Above each of the bearing ears 99 each vertically adjustable support 87 carries an outwardly directed trunnion 112, as shown in Figures 2 and 4, and each of these trunnions supports a rock plate, the plate upon the right side of the machine being indicated by the numeral 113, and the plate upon the left side of the machine being indicated by the numeral 114. These rocker plates are substantially U-shaped as shown, and the upper leg of each plate, indicated by the numerals 115, extends toward the front of the machine and has the supporting trunnion 112 extended therethrough adjacent the inner or rear end thereof. The other leg of each rocker plate, indicated by the numeral 116, has a longitudinally extending slot 117 therein in which slot engages a stop pin 117" which is secured to the adjacent adjustable support 87, as is shown in Figures 2 and 4. The slots 117 are struck from the arc of the supporting trunnions 112 so that it will be seen that each of the rocker plates has swinging movement which is limited by these pins and when the plates are oscillated upon the trunnions 112 the upper legs 115 have their free ends swung in a vertical arc.

The rocker plates are connected together across the back of the machine and rearwardly of their supporting trunnions by a pair of vertically spaced parallel bars 117'. These bars are rigidly secured to the rocker plates against turning so that when the rocker plates are oscillated they will be oscillated in unison and these bars will maintain at all times their spaced parallel relation.

The bars 117' are connected together intermediate their ends by gripper supporting castings 118 and each of these castings intermediate its ends is formed to provide a guide sleeve 119 which extends transversely of the casting and which slidably supports a reciprocable saddle rod 120. These saddle rods are horizontally disposed when the machine is in starting position or, in other words, when the rocker plates are dispersed so that the bars 117' are located directly one above the other. Each of these saddle rods is of substantial length, as is shown in Figures 11 and 16, and each extends from its supporting casting into the rear of the adjacent bottle receiver 69. Upon its forward end each bar 120 has pivotally supported for rocking movement on a horizontal axis, a bottle engaging saddle 121 which is located within a bottle receiver. Between each bottle saddle and the guide sleeve 119 through which the saddle rod extends, is an expansion spring 122 which tends to constantly urge movement of the saddle rod and of the saddle inwardly into the adjacent receiver.

Upon the outer end of each saddle rod is mounted a gripper block 123. Each of these gripper blocks is formed to provide a top forwardly facing shoulder 124, while from the underside of each gripper block there extends downwardly an ear 125 through which is threaded a screw 126. As shown in Figures 11 and 16, each of these screws is secured after adjustment longitudinally of the adjacent saddle rod, by a binding nut 127 and the forward end of each gripper block screw carries a cylindrical head 128, the axis of which extends longitudinally of the adjacent saddle rod. These heads when properly adjusted lengthwise of the adjacent saddle rods may be brought into position between the gripper blocks and the underlying teeter finger supporting stop pins and when in such position they limit the upward swinging of the stop pins and consequently the degree of oscillation of the teeter fingers and in this manner the movement of the timer cams is controlled. This operation will be more fully hereinafter described.

Extending transversely of the rear of the machine and rockably supported at its ends by the rocker plates, is a trip rod 129. Intermediate its ends this trip rod is provided with an offset crank portion 130, as shown in Figure 3, and this offset portion extends across the tops of the gripper blocks 123.

At each end of the offset crank portion of the trip rod there is secured to the rod a forwardly extending slotted finger 131, the slot of which is indicated by the numeral 132 in Figure 17. Extending vertically through the slot of each of these trip rod carried fingers is a cam actuating rod 133 which, as is best illustrated in Figures 11, 12 and 13, is pivotally connected at its lower end with an upwardly extending finger 102 which forms a part of a sleeve which is secured to the cam bar 100. These cam actuating rods 133 carry collars 134, each of which is disposed just above a slotted finger 131 so that when the cam actuating rod is shifted longitudinally downwardly the collar 134 will strike the finger 131 to effect the oscillation of the trip rod so as to swing the crank portion 130 thereof upwardly. The means for actuating these rods 133 is hereinafter described.

The lower one of the bars 117' carries a rearwardly extending finger 135, Figures 3, 11 and 16, which supports a stop screw 136. This stop screw 136, Figure 3, limits the downward swinging movement of the crank portion 130 of the trip rod 129 so that when the gripper blocks are moved rearwardly the trip rod crank portion cannot drop in front of the shoulders 124.

Connected with the upper one of the bars 117' is a series of U-shaped latches 137 each of which extends rearwardly over a gripper bar and has a yoke portion 138 which is adapted to engage the shoulder 124 of the underlying gripper block after the latter is moved rearwardly by the bottles introduced into the adjacent receiver, as illustrated in Figure 13, and the saddle rod is tipped to the position shown in Fig. 16 where the spring 122 takes control and tends to move the rod forwardly again. When the latches drop off of the tops of the gripper blocks when the latter are shifted rearwardly, as shown in Figure 13, they will drop onto the crank portion of the trip rod 129 so as to be maintained at the proper elevation to engage the shoulders 124 of the gripper blocks when the latter again move forwardly.

Each of the bearing supports 94 has formed integrally therewith a rearwardly projecting bearing ear 139 and extending across the back of the machine and rockably supported by these bearing ears 139 is a trip shaft 140. This shaft has secured thereto adjacent each end a rearwardly projecting finger 141 and to each of these fingers is pivotally coupled by means of a stud 142, the upper end of an actuating rod 133, for the cam bar 100, Figures 11 and 13.

At substantially the center of the trip shaft 140 there is mounted on the shaft a timer reset block 143 which is formed to provide a guide sleeve 144 which, when the block is in its normal position, as shown in Figure 13, is substantially horizontal. The outer end of this sleeve has threaded therein a guide nut 145 through which nut is threaded a screw stem 146 upon the rear end of which is a knurled head 147.

Within the sleeve 144 is located an end of a timer reset pin 148 which is controlled by a spring 149 which is housed within the sleeve, as shown in Figure 13, and which normally functions to retract the pin into the sleeve and into contact with the threaded or screw stem 146.

The block 143 is provided with a slot 143' which extends slightly more than a quarter of the distance around the block supporting shaft 140. The shaft 140 carries a stop pin 140' which is located in this slot 143' of the block. This pin is normally horizontal as shown in Figure 11 and there is connected between the top of the guide sleeve 144 and an overlying fixed portion of the machine, as shown in Figures 1 and 3, a spring 144' which normally rocks the block to the horizontal position shown.

The block 143 is adapted to be rocked by the contact of the hereinafter described top elevator plate. When the block 143 is rocked in a direction to depress the trip pin 148 the spring 144' will be tensioned and the block will merely idle around the supporting shaft 140, the pin 140' moving relatively to and in the recess 143'. After the trip pin engaging part of the machine has moved down past the trip pin the spring 144' will swing the block back to the position in which it is shown in Figures 11 and 13 so that the pin will be in position to be engaged by the said moving part or top elevator plate upon the return movement of the plate. When the plate moves back to its raised position it engages the pin 148 and raises it to oscillate the block in the opposite direction. Since the pin 140' is then in the top of the slot 143' it will be seen that the block cannot turn in this opposite direction independently of the shaft 140 and, therefore, rotary motion is imparted to the shaft and a downward thrust is imparted to the links 133 for the purpose of turning the cam bar 100 for the release of the gripper blocks 123 by lowering the teeter carried pins 111 by the downward thrust of collars 134 on rods 133 thereby causing crank portions 130 of rod 129 to be raised and come in contact with the U-shaped latches 137 and impart an upward motion to the lower ends of the latches to cause them to release gripper blocks 123 and permit the blocks and the saddles to be shifted forward under the action of the springs 122. The function of the timer reset pin 148 will become apparent in the description of the operation of the machine.

At one side of the machine, here shown as the left side, the plate 7, shown in Figure 1, supports a vertically arranged piston cylinder 150 which will be referred to as the gripper cylinder. This cylinder has a fluid line 151 which is connected with the lower end thereof for the purpose hereinafter stated and there is connected with the upper end of the cylinder a drain pipe 152 through which there may escape from the cylinder any fluid which may work past the piston, not shown, which is reciprocable in the cylinder. The said piston within the cylinder 150 has connected therewith the stem 153 which extends upwardly from the top of the cylinder and this stem is adjustably attached at its upper end to the inturned upper end portion of a vertical bracket 154 which, at its lower end, is fixed to a collar 155 which encircles the gripper cylinder 150 and has sliding movement thereon.

This collar 155 carries a pivot stud 156, Figures 2 and 3, which passes through a bracing yoke 157 which is attached to the bracket 154.

The numeral 158 designates a counterweight supporting arm, Figure 2. One end of this arm is fixed to the upper forwardly extending leg 115 of the adjacent rocker plate 114. The arm 158 is provided with a longitudinal slot 159 through which the stud 156 passes and in which it slides and the opposite end of the arm from the rocker plate 114 carries a counterweight 160.

Top elevator plate and finder heads

The numeral 161 designates an elevator plate which is disposed horizontally in the top part of the frame structure, as is clearly shown in any one of the Figures 1, 2, 3, 4, etc. This elevator plate is provided at each end with a recess 162, as shown in Figures 2 and 4, and with upstanding yokes 163, each of which extends over or straddles a recess. There are also mounted upon the top of the top elevator plate at each end the upstanding pilot bearings 164 each of which is disposed adjacent a corner of a plate and each of which has one of the vertical main guides 8, Figure 1, slidably extended therethrough. To the upper end of each main guide there is secured a stop collar 165 which carries a resilient bumper 166 which limits the upward movement of the pilot bearing.

Upon each of the horizontal plates 7, which are disposed just above the floor 15 at each side of the machine, there is supported the vertical head cylinder 167 in which is disposed a piston, not shown, which is connected with a piston rod 168 which extends upwardly into a yoke 169 to which it is connected, as shown most clearly in Figures 13 and 16. A resilient bumper 169 forms a part of the connecting means between the yokes and the piston rods 168, as shown in Figures 13 and 16, to absorb shocks.

Suspended from the top elevator plate by means of pairs of forwardly and rearwardly spaced hanger rods 170 is a series of finder head units, each indicated generally by the numeral 171. Each of these finder head units includes a vertically arranged rectangular frame 172 with the top part of which is connected a pair of hanger rods 170, as is clearly shown in Figures 13 and 16. As will be clearly seen, there is a finder head unit for each bottle receiving space 69 and these units are of an overall width which is less than the width of the underlying space so that each unit may be lowered into a bottle receiving space in the course of the operation of the machine.

The lower or bottom part of each finder head frame 172 is indicated by the numeral 173 and this is in the form of a single horizontal plate for supporting a number of finders 174 which correspond in number with the number of openings 16 in the underlying group which extends lengthwise of the bottle receiving chamber or area. The finder supporting plate has a number of oppositely disposed pairs of edge recesses 175, the purpose of which will be hereinafter more fully explained and the top surface of each plate 173 between these recesses and along each longitudinal edge is provided with a channel 176. Between each pair of oppositely disposed channels the plate 173 is provided with an opening 177.

As shown in Figure 19, the finder 174 is in the form of a hollow frustro-conical body, the inner surface of which tapers upwardly, as indicated at 178, to a cylindrical top portion 179 which is exteriorly screw threaded. This screw threaded cylindrical top portion 179 of the finder extends through an opening 177 in the finder plate and has threaded thereon the ring nut 180 which draws the upper part of the conical portion of the finder against the underside of the plate and thus firmly secures the finder in position.

Each of the channels 176 has located therein and fixed to the plate 173, a pair of pivot studs 181 and each pair of studs supports between them for vertical rocking movement, an inwardly extending substantially V-shaped hinge arm 182. Each of these arms is integrally connected with a latch bar 183. These latch bars 183 are of slightly arcuate form and the hinge arms are connected to the convex sides thereof so that the concave sides of each two adjacent latch bars are in opposed relation. The latch bars are supported by the hinge arms so that each will just extend over one side of the opening formed by the adjacent tubular portion 179 of the underlying finder and the distance between the centers of the latch bars is only slightly greater than the diameter of the neck of a bottle 59 just below the roll or bead 59' of the bottle neck, as shown in Figure 19. The adjacent ends of adjacent pairs of latching bars 183 is in the form of a short straight portion 184 and these straight terminal portions of the latching bars of one pair are in substantially end opposed relation with similar portions of the adjacent pair of bars.

Between each pair of finders there is secured to the finder plate 173, a pair of upwardly extending guide posts 185 and these guide posts are in spaced relation transversely of the plate between a pair of oppositely disposed recesses 175, as shown in Figure 18, and they extend through and maintain in superposed relation a pair of latch bar actuating plates 186 and 187. Interposed between each pair of plates 186 and 187 and surrounding each guide post, is a spacing collar 188 which maintains these plates in desired spaced relation. Surrounding the posts 185 are expansion springs 189 which are coupled at their upper ends to the posts as shown and at the lower ends bear upon the underlying uppermost plate 186.

The actuating plates 186 and 187 have the terminal posts 184 of the adjacent pairs of latch bars loosely engaged therebetween.

The bottom plate 187 of each pair has secured thereto on a line extending longitudinally of the plate 173 through the centers of the finders, a trigger pin 190 which extends downwardly a substantial distance between the adjacent pair of finders 174, as shown in Figure 20. Since the terminal portions 184 of the latch bars are on opposite sides of the longitudinal center of the plate 173 through which the pin 190 passes, it will be seen that when the pin 190 is forced upwardly, latch bars 183 will be rocked upwardly and outwardly away from one another so as to enlarge the distance between them and thus permit the roll 59' of a bottle to enter or permit such roll to pass outwardly from between the bars and through the finder.

*Bottom elevator plate and spacer mechanism*

The numeral 191 designates a second or lower elevator plate which is below and in spaced parallel relation with the top elevator plate 161. Secured to the top of this plate are a number of vertically extending guide rods 192 which extend upwardly through pilot bearings 193 which are carried upon the top of the top elevator plate, as is shown most clearly in Figures 11 and 13. The upper end of each of the guide rods 192 has a nut 194 secured thereto and surrounding each of the guide rods and resting upon the top of the pilot bearing through which it passes is a pair of plates 195 between which is held a resilient shock absorbing body 196. The lower or bottom elevator is raised by the top elevator plate and moves downwardly therewith by gravity. In order to steady the bottom elevator plate there is mounted at each forward corner a steadying roller 197 which, as shown in Figures 11 and 13, is mounted for rotation on a horizontal axis and bears against the inner side of the adjacent front upright 1 of the machine frame.

The bottom or lower elevator plate is provided with a longitudinally extending slot 198 which is adjacent its forward edge and through which extends the hanger rods 170 which are connected with the finder header units at the front of the machine. A larger opening 199 is formed through the bottom elevator plate back of the slot 198 and through which opening the rear ones of the hanger rods 170 extend, as is clearly shown in Figures 11 and 13. Thus, it will be seen that the hanger rods and finder head units are entirely independent of the bottom elevator plate, being carried solely by the top elevator plate.

At each end of the opening 199 the bottom plate 191 supports a bearing block 200 and extending lengthwise of the bottom elevator plate over the opening 199 and having its ends rockably supported in the blocks 200 in a cradle rock shaft 201.

The numeral 202 designates a plate which will be hereinafter referred to as the cradle. This plate extends lengthwise of the lower elevator plate over the opening 199, as shown in Figures 11, 13 and 16, and lies beneath the rock shaft 201 and has at each end an upturned portion 203 through which the rock shaft passes. The rock shaft is secured to the upturned end portion of the cradle by suitable binding nuts 204 so that the cradle may be secured in proper adjusted position on the shaft by means of the slots 205 which are formed lengthwise in the upturned ends 203 of the cradle and through which the rock shaft passes.

At one end of the cradle at the rear thereof, as shown in Figure 7, and here shown as being at the right hand side of the machine, the cradle has secured thereto the laterally extending arm 206 which carries the horizontal rearwardly extending threaded pin 207 upon the rear end of which is mounted a cam roller 208. This cam roller is directed toward the inner side of the adjacent rear frame upright 1ª and secured to this inner side of this frame upright is a cam strip 209, the upper end of which is angled to form a camming surface 210 which slopes toward the adjacent face of the corner upright 1ª. This angled surface is directly below the cam roller 208 and when the elevator plates are in their uppermost positions the roller is spaced a substantial distance from the angled end of the cam strip and the arm carrying the roller is rocked downwardly slightly as is also the cradle plate to which it is attached. This angled position of the cradle plate is clearly shown in Figure 11 and the cradle constantly maintains this position when the supporting elevator plate is in its raised position but when the elevator plate is lowered so as to cause the cam roller to ride on the cam strip 209, the cradle plate will be oscillated to a horizontal position as it is shown in Figures 13 and 16. This operation will be hereinafter more fully explained. The cradle plate 202 is provided at each of its ends with adjustable stop screws 211 which are disposed on opposite sides of the rock shaft 201 and which functions to limit the tilting of the cradle to the position in which it is shown in Figure 11 and prevent the cradle from being thrown beyond the horizontal position in which it is shown in Figures 13 and 16 when the cam roller 208 strikes the cam strip 209.

From the opposite end of the cradle 202 from the arm 206 there is secured a laterally extending bracket arm 212 which carries an outwardly extending finger 213.

Supported on a suitable pivot pin 214, Figure 2, is a collar 215 which carries a rearwardly extending downwardly curved presser foot 216 which is slotted, as indicated at 217 in Figure 7.

Upon the corner upright 1ª of the frame adjacent to the presser foot 216 there is supported between the spaced guides 218 a vertically shiftable rod 219 which lies in the slot 217 of the presser foot. Above the presser foot the rod carries a nut 220 which bears against the top of the presser foot.

Below the lower guide 218 the rod 219 carries a stop 221 and between this stop and the overlying guide 218 an expansion spring 222 is interposed which normally tends to pull the rod downwardly, the downward movement being limited by the adjustment nut 223 which is threaded upon the upper end of the rod. As is shown in Figure 2, the forward end of the presser foot lies beneath the finger 213 which is carried by the cradle while upon the opposite side of the pivot 214 the presser foot is engaged by the nut 220 of the vertically movable rod. Thus, it will be seen that as the lower or bottom elevator plate 191 moves downwardly and the cam roller 208 strikes the cam strip 209, the finger 213 will simultaneously strike the presser foot 216 and since the upward movement of the opposite end of the presser foot is resisted by the spring 222, a twisting strain will be applied to the cradle which corresponds with the strain applied thereto when the cam roller strikes the camming strip and thus the oscillation of the cradle without twist or distortion will be effected.

Associated with each finder head and hanging from the bottom elevator plate in a plane passing between the first and second finders from the front of the machine is a substantially U-shaped bottle spacer 224. These bottle spacers are relatively long, as is clearly shown in Figures 11, 13 and 16, and the sides thereof extend downwardly on opposite sides of a finder head frame to a substantial distance below the finders and at their lower ends each has the transverse yoke portion 225 which is shown in Figure 16 as being directly in vertical alinement with a trigger pin 190. This bottle spacer 224 is rigidly attached to the bottom elevator plate and is maintained rigidly vertically. In spaced relation with each of the front bottle spacers 224 are two substantially U-shaped bottle spacers 226 each of which is rigidly secured at its upper end to the cradle plate 202, as shown in Figures 11, 13 and 16. These bottle spacers 226 are oscillatable or swingable with the cradle and each straddles a finder frame and has a transverse yoke portion at its lower end like the front spacer 224. The shiftable bottle spacers 226 have their two side portions offset above the yoke, as indicated at 226'. By providing these offsets 226' in the sides of the swinging spacers 226 the spacers are able to oscillate lengthwise of the bottom plates of the finder heads in the recesses 175 as is necessary while, at the same time, the bottom cross bar or yoke portion of each swinging spacer is kept in line with the upper ends of the sides which are attached to the cradle. Thus, it will be seen that when the cradle is in tilted position, as in Figure 11, the yokes of the swinging spacers will be at a fixed distance from one another but the yoke of the forward one of the pair of swinging spacers will be closer to the yoke of the fixed spacer than it will be after the cradle has oscillated to shift the bottles, as shown in Figure 13, and after this movement of the spacers has taken place, it will be noted that the yoke portions at the bottoms of the spacers are all equi-distantly spaced from the front to the rear of the machine.

It will also be noted upon reference to Figure 16 that when the bottom elevator plate is at its lowermost position and the spacers are consequently equi-distantly spaced at their yoke or lower ends each yoke of each spacer will be directly beneath a trigger finger 190 to be engaged thereby for the actuation of the latching bars or bottle neck grippers to effect the release of the bottles.

Each of the vertical guides 8 has secured thereto a top elevator plate stop collar 227 and below and spaced from each of these stop collars 227 is a bottom elevator plate stop collar 228, Figures 2, 5 and 6. As shown in Figures 5 and 6, the top elevator plate 161 extends at the sides of the machine beyond the lower or bottom elevator plate 191 and since the top plate has the guides 8 passing therethrough it will be apparent that as these plates come down the lower plate will pass the top plate stop 227 but the upper plate will contact the stop 227. The lower or bottom plate stops have inwardly extending arms or fingers 229 each of which carries a vertically adjustable stop screw 230 with which the bottom plate engages. This arrangement permits the top plate to continue its downward movement to a limited extent after the bottom elevator plate has been stopped.

*Operating and control mechanism*

While the present machine may be operated by any suitable form of power it is designed as here disclosed to be operated by fluid pressure, preferably by hydraulic pressure. Figure 23 of the drawings illustrates diagrammatically the mechanism by which the several moving parts of the machine are actuated by hydraulic pressure.

As is shown most clearly in this figure, the top elevator plate 161 carries upon that end adjacent the right hand side of the machine, a laterally extending arm 231 upon the outer end of which is supported a roller 232.

The numeral 233 designates in Figure 23 and also in Figure 21 a quick acting spring closed valve of standard type which includes a reciprocable valve stem 234 which, when forced downwardly, opens the valve. This valve 233 supports a vertical bracket 235 which carries a horizontal pivot 236. This horizontal pivot rockably supports a vertical valve bar, indicated generally by the numeral 237, which, adjacent its pivotal support, has a lateral finger 238 which positions over the upper end of the valve pin 234 and carries an adjustable contact screw 239 which bears against the top end of the valve pin. The upper half of the valve bar 237, above the pivot 236 is engaged upon the outer side, which is the side away from the machine, by the top elevator plate carried roller 232 and this upper portion of the bar is provided with a camming offset or recess 240, which is designated to receive the roller 232 at a predetermined position in the downward movement of the top elevator plate 161.

Below the pivot 236 for the valve bar the bar is provided with the obliquely inwardly directed terminal cam roller release finger 241. This roller release finger for the valve bar is disposed in the path of movement of the upper leg 115 of the adjacent or right rocker plate 113.

Disposed horizontally at the right side of the machine is a valve operating rock shaft 242 which is provided with the two outwardly extending arms 243 and 244. This valve rock shaft 242 has secured thereto an inwardly directed V-shaped fork 245, the upper and lower arms of the fork being indicated by the numerals 246 and 247, respectively.

Below the valve rock shaft 242 are two three-way valves 248 and 249, the valve 248 being operatively coupled with the arm 243 by a link 243' and constituting the floor cylinder control valve or floor valve, while the valve 249 constitutes the gripper cylinder control valve or gripper valve and is operatively coupled to the arm 244 by the link 244'.

The valve actuating fork 245 is arranged so that its lower finger 247 will be engaged by the top elevator plate on the downward movement of the same and the upper finger 246 will be engaged by the top elevator plate on the upward movement of the same and when the top elevator plate is in its topmost position, the fork will be arranged with the finger 247 in position for engagement by the plate and the floor valve 248 will be set to exhaust the floor cylinder 17, while the gripper valve 249 will be set for the admission of fluid to the gripper cylinder 150.

Below the valve rock shaft 242 is a second valve rock shaft 250. This shaft is supported for oscillation on a horizontal axis and carries a single inwardly extending finger 251 which is arranged to be engaged by the top elevator plate just as the latter moves into its final lowermost position.

The rock shaft 250 carries an arm 252 and this is operatively coupled by the link 253 with a three-way valve 254 which controls the flow of the operating fluid to the conveyor cylinders and which is set, when the machine is in starting position, to admit the fluid to these cylinders 47 so that the pistons thereof will be raised to hold the conveyor in elevated position, as it is shown in Figure 1.

At a convenient position upon the right hand side of the machine there is mounted a three-way valve 255 which is the main control valve. This valve is shown in position in Figure 3, and has an operating handle 256 which is shown in Figure 23, as being in horizontal position, in which position the valve is set to admit fluid to the system from a supply manifold 257. This manifold may be located in any suitable position in the machine and preferably is disposed in the front right hand corner of the machine at the bottom thereof, as shown in Figure 1. Behind the intake or supply manifold 257 there is located an exhaust manifold 258 to which all of the exhaust pipes of the several cylinder units lead. This exhaust manifold is shown in Figure 3.

Leading from the fluid supply or intake manifold is a supply pipe 259 which leads to the intake port of the main valve 255 and from this valve leads the elevator cylinder supply pipe 260 which, as shown in Figure 23, when the valve 255 is in machine starting position, is in direct communication with the supply pipe 259 so that the cylinders 167 will be filled and the elevator plates will be raised to their fullest positions. Leading from the valve 255 is an exhaust pipe line 261 in which line is interposed the valve 233 hereinafter referred to as the header unit check valve. This exhaust line 261 leads from the valve 255 through the header check valve 233 and to the exhaust manifold 258. As will be seen upon reference to Figure 23, when the main control valve 255 is in position where the intake manifold is in direct communication with the elevator cylinders 167 the exhaust line 261 is shut off from communication with the elevator cylinders but when the handle 256 of the main control valve is swung down in the direction of the arrow, the exhaust line 261 will be put into direct communication with the elevator cylinders 167 so that the fluid may exhaust from these cylinders through the valve 255 and through the valve 233 to the exhaust manifold to permit the elevator plates and headers to descend under the action of gravity.

Leading from the supply manifold 257 to the floor valve 248 is a pipe 262 and the floor valve has an outlet pipe line 263 connected therewith which leads to the floor cylinder 17. A third pipe 264 leading from the floor valve constitutes an exhaust line leading to the exhaust manifold 258.

The numeral 265 designates a supply pipe leading from the supply manifold 257 to one side of the gripper valve 249 and from the other side of this valve a pipe line 266 leads to the gripper cylinder 150. A third pipe line 267 connects with the gripper valve 249 and forms an exhaust line leading therefrom to the exhaust manifold 258 and is connected with the gripper cylinder through the valve 249 when the elevator plate descends and strikes the finger 247 of the fork 245. This valve 249 is set, when the elevators are raised, so that fluid will pass directly from the supply manifold to the gripper cylinder so as to maintain the gripper cylinder raised and the floor valve 248 is set when the elevators are in raised position so that the floor cylinder 17 is in communication through the lines 263 and 264 with the exhaust manifold 258 but when the top elevator plate lowers and swings the finger 247 downwardly this valve is turned so as to establish communication between the floor cylinder and the fluid supply manifold.

The numeral 268 designates a fluid supply line leading from the supply manifold to an inlet of the conveyor cylinder valve 254. This valve has leading therefrom the supply pipe line 269 which is in direct communication with the pipe 268 through the valve when the elevators are in raised position. A spring 270 is connected with the conveyor valve actuating arm 252 to normally swing the arm in a direction to set the valve into the stated position wherein the conveyor cylinders 47 are in direct communication with the supply manifold through the pipes 268 and 269. When the finger 251 is pressed down by the top conveyor plate as it reaches the bottom of its movement, the conveyor valve 254 will be turned so as to establish direct communication between the pipe line 269 and the pipe line 271 which leads from the outlet or exhaust side of the conveyor valve to the exhaust manifold so that the contents of the conveyor cylinders 47 will be forced out by the weight of the conveyor and the filled bottle crate on the conveyor and the conveyor will lower.

Each of the fluid supply lines 259, 262, 265 and 268 is provided with a hand control valve 272. By means of these valves the flow of fluid to the several pipe lines named may be controlled independently of the main machine control valve 255.

The numeral 273 designates the main supply pipe leading to the intake to the supply manifold and the numeral 274 designates the main drain pipe leading from the exhaust manifold.

Operation

At the beginning of the operation of the machine, the control valve 255 is in the position shown in Figure 23 and also shown in Figure 3 in which position, as previously stated, the operating fluid from the supply manifold 257 has passed into the elevator cylinders 167 and it has also passed through the gripper valve 249 into the gripper cylinder 150 and through the conveyor valve 254 into the conveyor cylinders 47. The elevator plates 161 and 191 are, therefore, raised to their maximum positions, as shown in Figures 1, 2, 3 and 4 and the conveyor C is in raised position in which it is shown in these figures so that a crate 57 when placed on the conveyor rollers will be disposed with its top in close proximity to the underside of the floor 15, as shown in Figure 16. In this figure, however, the other parts are not in the position in which they are here illustrated with respect to the floor, at this stage of the operation of the machine. The floor cylinder 17 is, of course, exhausted of operating fluid so that the springs 14 have control to move the floor fully to the right so that the lines or groups of apertures 16 are out of alinement with the bottle receiving areas 69 and the tracks 21 lie at the centers of such areas.

The saddle bars 120 and the gripper blocks 123 are in horizontal position and the springs 122 have forced the saddles 121 forwardly in their respective bottle receiving areas approximately to the positions indicated in dotted outline in Figure 11. When the saddles are in this forward position in the bottle receiving areas, the stop pins 111 of the teeter fingers are in engagement with the adjacent heads 128, as shown in Figure 4, so that the teeter fingers will be rocked to a position where their forward ends will be raised and they will thus push upwardly upon the timer cam rods 109 to maintain the timer cams in the positions shown in Figure 3 where the adjacent reciprocable rods can be moved backwardly and forwardly. In other words, the heads 82 of the reciprocable rods 78 will be free to move through the cut-out spaces or notches 86 of the timer cams. This permits the free oscillation of the offset or crank portions 75 of the rock shafts 72 which are at the entrances to the bottle receiving areas.

Since the gripper cylinder 150 is filled with fluid the counterweight 160 will be raised and the right and left rocker plates will be in the proper position to maintain the gripper blocks and saddle supporting rods 123 and 120 respectively, in horizontal position. These are the positions of the several parts of the machine when the machine is ready to receive bottles from the supplying conveyor 58 in the several receiving areas 69. It will, of course, be understood that since the elevators are raised as stated, the finders 174 will be disposed above the tops of the bottle receiving areas and the oscillatable spacers 226 will be tilted substantially as shown in Figure 11.

The bottles are now fed into the receiving areas 69 and each time a bottle enters the area it will engage the roller 76 on the crank portion of the rock shaft 72 which is at the entrance side of the receiving area and will cause the shaft 72 to rock, actuating the eccentric disks 77 and causing reciprocation of the rods 78 which are connected with these disks. When the third bottle has entered each receiving area, it being of course assumed that the machine is set up for handling twenty-four bottles in a group with four bottles to each area, it will be in contact with or about to contact the saddle 121 which is located in the receiving area. As the next or fourth bottle is shoved into each receiving area it of course moves the preceding bottles further inward or toward the rear of the area and forces positive rearward movement of the saddle 121, the saddle bar 120 and the gripper block 123 at the rear end of the bar. This movement causes the gripper blocks to shift to a position where each of the pin engaging heads 128 will move off of the upper end of the adjacent pin 111 and allow forward ends of the teeter fingers 106 to drop so as to oscillate the attached timer cam 84 into a position where the point of the cam comes in line with the adjacent reciprocable rod head 82. The timer cam then functions to prevent further reciprocable movement of the adjacent head and rod 78 and consequently the rock shafts 72 cannot be turned with the result that the next bottle moving toward each receiving area is stopped from entering the area by the roller 76 on the crank portion of the rock shaft. Such a checked or stopped bottle is shown in dotted outline in Figure 11.

After each of the bottle receiving areas 69 has received its full quota of bottles corresponding in number with the overlying finders the bottles will be supported in side by side contacting relation upon a track 21 as they are shown in Figure 11 and it will be seen that in this grouped position they are not properly spaced to be gripped by the latch bars at the tops of the finders when the finders are lowered. It is, therefore, necessary that the bottles be separated or shifted apart so that they will be properly positioned each beneath one of the finders 174. This separating of the bottles is accomplished by the spacers 224 and 226 as the finder heads are lowered with the overlying elevator plates in the manner about to be described.

When the receiving areas have received the proper number of bottles the attendant at the machine then turns the control valve handle 256 down so that the pipe line 260, which is connected with the elevator cylinders 167, is put into communication with the pipe line 261 which leads through the open finder head checking valve to the exhaust manifold 258 and the pipe 259 is shut off at the valve 255. The elevator plates 161 and 191 now begin to move downwardly by gravity and the fluid will be forced out of the cylinders 167 and will function as a cushioning means for smoothly lowering the plates and the finder heads. At the same time it will be noted that the cam roller 232 which is attached to the top elevator plate moves down along the upper end of the valve bar 237. As the downward movement of the elevator plates proceeds, the cradle rocking roller 208, Figures 7 and 8, will ride onto the cam strip 209 to effect the rocking of the cradle 202 to the horizontal position in which it is shown in Figure 13.

Figure 11 shows the elevator plates when they have moved a short distance downwardly and the upper or top plate has passed the finger 148 of the timer reset mechanism which is supported on a shaft 140. The elevator plates in this position have not yet reached the position where the cradle rocking roller 208 has moved onto the cam strip 209 as it will be seen that the oscillatable spacers 226 are still inclined or oblique to the fixed spacer 224 but the yokes of the spacers have moved into position between the necks of the bottles.

Continued downward movement of the elevators causes the cam roller 208 and the cam strip 209 to coact for the rocking of the cradle 202 to the position in which it is shown in Figure 13 and in this figure it will be seen that the caps of the bottles and the beads or molds 59' around the bottle necks just below the caps have passed the latch bars 183. When the spacers move into position between the bottles they shift the bottles so that the caps will enter the finders 174 and the latches will ride over the caps and then drop back into position beneath the molds around the neck of the bottle. Also when the rear spacer 226 shifts the rear bottle back into position it will force the saddle bar 120 further to the rear so that the latches 137 will drop onto the crank portion 130 of the trip rod 129 as is shown in Figure 13 to be supported thereon in alinement with the shoulder 124 of the adjacent gripper block.

Simultaneously with the dropping back of the latch bars 183 into position where each pair of latches or latch bars is in cooperative position around the neck of the bottle beneath the bead 59', the top elevator plate engages the lower finger 247 of the valve rock shaft controlling fork 245 and starts to swing the fork and to turn the shaft 242 and as the shaft moves the floor valve 248 into position to admit pressure fluid from the pipe 262 into the pipe 263, and moves the gripper valve into position to shut off the pipe 265 and to connect the pipe 266 with the drain pipe 267, the cam roller moves to a position opposite the offset or cam portion 240 of the valve bar 237, permitting this bar to swing on the pivot 236 in the direction of the arrow in Figure 23, causing the finger 238 to lift from the stem 234 and allowing the valve to shut. The shutting of the valve 233 checks the outflow of fluid from the elevator cylinders 167 and consequently the downward movement of the finder heads is stopped but this stopping of the movement of the finder heads is only momentary. However, the timing of the operation of the valves 248 and 249 with the closing operation of the valve 233 is such that when the momentary check is given to the downward movement of the timer heads, with which the bottle necks are now connected by the latches 183, pressure fluid enters the floor cylinder 17 to effect the shifting of the floor over to the left of the machine so as to bring each of the openings 16 into position beneath a bottle and, at the same time, the fluid in the gripper cylinder 150 is released and the counterweight 160 causes the piston to be forced downwardly with the result that the rocker plates are oscillated by this movement of the counterweight.

When the cam roller 232 which is carried by the top elevator plate 161 permits the slight swinging movement of the valve bar 237 whereby the momentary closing of the finder head check valve is permitted, the angled terminal finger 241 at the lower end of the valve bar swings into the path of movement of the leg 115 of the right rocker plate 113. This leg in swinging down strikes the finger 241 and causes the valve bar 237 to be rocked back to its initial position with the result that the roller 232 is released from the cam recess 240 of the valve bar 237 and the finder head check valve 233 is immediately reopened.

Upon the reopening of the finder head check valve 233 the downward movement of the elevator plates continues, it being understood that the bottles are now suspended by the neck rings or beads 59' from the latches 183 and are lowered through the openings 16 of the shifted floor 15. Figure 13 shows the bottles ready for the continuance of the lowering movement. However, it will be noted that in this figure the saddles 121 are still in contact with the rear bottles of each group but it will be recalled that the reciprocable rods 120 which carry the saddles are supported by the castings 118 and that these are supported in turn upon bars 117' which are secured to the rocker plates and, therefore, when the rocker plates are oscillated by the counterweight 160, as previously explained, to reopen the finder check valve 233 so as to permit the continued down movement of the finder frames and finders, the saddles, saddle rods and gripper blocks will be rocked to the inclined position, shown in Figure 16, thus removing the saddles from contact with the bottles and, therefore, permitting the bottles to move smoothly downwardly without danger of labels or wrappings thereon being torn or marred.

When the elevator plates have moved downwardly a predetermined distance the bottom plate 191 will contact the movement limiting stops therefor which are supported upon the main guides 8 and indicated in Figures 5 and 6 by the numeral 230 thereby stopping the dividers in the positions shown in Figure 16 where the yokes thereof will be in relatively close proximity to the floor 15. However, downward movement of the top elevator plate 161 continues so that the finder heads 172 continue to move down to lower the bottles into the compartments or cells of the crate 57 and as will be seen upon reference to Figure 16, the finders move to a final position, where they are stopped by contact of the top elevator plate 161 with the stop collars 227 upon the guide posts 8, Figures 5 and 6, where they are just within the bottle openings 16 of the floor and just before the finders reach this final position, the trigger pins 190 contact the cross yokes of the spacers 224—226, as shown in Figure 16, so as to swing the latching bars of each pair upwardly and outwardly and quickly release the bottles. This upward and outward swinging of the latch bars 183 removes them immediately from the sides of the bottle caps so that as the bottles are released there is no danger of the caps hooking on the latch bars and being loosened.

It will be seen that since the bottle crate is supported with its top in close proximity to the floor 15 and since the holding latches grip the bottle necks at their upper ends and move down into close proximity to the top of the crate, the bottles when released will have only a short distance of free movement into the crate and will, therefore, not fall or drop with any force which would be injurious to the contents of the bottles.

As will be seen upon reference to Figure 6, when the top elevator plate 161 reaches its lowermost position where it engages the stops 227 it will have engaged the lowermost valve actuating finger 251 and oscillated the same downwardly to effect the turning of the shaft 250. This causes the conveyor valve 254 to be turned to a position where the pipe line 268 will be shut off and the pipes 269 and 271 will be put into communication. This permits the weight of the conveyor and the filled crate thereon to force the pistons of the conveyor cylinders downwardly and force the fluid out of the cylinders and as the conveyor lowers, the link 37, Figure 2, which is connected with the shaft which supports the jump roll 41, will be pulled so as to turn the shaft 35 and swing the jump roll forwardly and downwardly into the plane of the rollers 29 of the conveyor. The forward end of the conveyor will drop below the rear end due to the unbalanced condition of the conveyor, as previously stated, and the filled crate will thus be caused to roll off of the conveyor by gravity.

After the filled crate has been removed from the conveyor the attendant of the machine then returns the main control valve 255 to its former position, in which position it is shown in Figure 23, whereupon fluid will return to the elevator cylinders 167 so as to raise the elevator plates and finder head units to their former position and during such raising the top elevator plate will engage the top finger 246 of the fork 245 to return the floor valve 248 and the gripper valve 249 to the positions in which they are shown in Figure 23 so that the floor cylinder will be exhausted and the control springs 14, previously compressed, will expand to return the floor to the right side of the machine and the gripper cylinder will be filled to effect the raising of the counterweight 160 so as to rock the timer blocks, the saddle rods 120 and saddles 121 to their former horizontal positions as they are shown in Figure 11.

When the saddles were swung downwardly in the manner previously described the springs 122 partially expanded to move the saddle rods and saddles forwardly but such forward movement was checked by the latches 137 engaged against the shoulders 124 of the gripper blocks, as shown in Figure 16. Thus, when the rocker plates are oscillated back to their initial positions by the raising of the counterweight through the introduction of pressure fluid into the gripper cylinder 150, it will be seen that the latches 137 will hold the gripper blocks 123 in retracted position. As the upper or top elevator plate continues to rise, it will come into contact with the pin 148 of the timer reset block and rock this block to effect the oscillation of the shaft 140 and the downward movement of the rods 133. This will effect the turning of the cam bar 100 beneath the forward ends of the teeter fingers 106 and, at the same time, the collars 134 upon the rods 133 will push down against the arms 131 which are secured to the trip rod 129. The turning of the cam bar 100 will lower the pins 111 which are supported upon the rear ends of the teeter fingers and the rocking of the trip rod 129 will cause the crank portion 130 to raise the latches 137 so as to release the gripper blocks and permit the springs 122 to shift the blocks and saddles forwardly. When the blocks move in this manner the stops 128 will move into position over the upper ends of the pins 11 and thus when the timer reset block is released by the top elevator plate 161 passing the pin 148 the teeter fingers will be held with their forward ends raised and the timer cams 184 will be reset to permit reciprocation of the reciprocable rods 78 and consequently the admission of more bottles into the bottle receiving areas from the bottle supplying conveyor 58 can take place.

It will, of course, be recalled that when the top elevator plate 161 reached its lowest position it depressed the conveyor valve actuating finger to exhaust the conveyor cylinders. When this plate starts on its return or upward movement it releases the valve actuating finger 251 and allows the spring 270 to rock shaft 250 and lower rod 253 and turn valve 254 to a position to allow fluid to flow from intake header 257 through lines 268 and 269 and into the cylinders 47 thereby causing the conveyor to be raised to a horizontal position to receive its next case.

I claim:

1. In a bottle crating machine, a bottle receiver, an apertured floor for the receiver onto which bottles are moved as they enter the receiver, a series of of collar like means movable vertically in the receiver into which the bottle necks enter and including adjacent latches for securing bottles by the necks to said movable means whereby the bottles may be lowered through the apertures of the floor into a receiving receptacle, means operating immediately following the securing of the bottles for shifting the floor to bring the apertures thereof beneath the bottles to facilitate the said lowering of the bottles, and means for tripping said latches when the bottles have been lowered a predetermined exent through the floor apertures into the receiving receptacle for the release of the bottle neck, comprising a vertically shiftable element lying between and coupled with each adjacent two of the latches, and means arranged for engagement by and to effect the vertical shifting of the element.

2. In a bottle crating machine, a means providing a receiver for a plurality of bottles, said receiver having a shiftable floor provided with openings for the movement therethrough of the bottles introduced into the receiver, the floor having an initial position in which the openings are out of alinement with the receiver, mechanism adjacent to the receiver and actuated by the bottles entering the receiver to limit to a prescribed number the bottles entering the receiver, said mechanism including a bottle contacting and moving part lying partly within the receiver, means movable vertically into the receiver for connection with each of said bottles to lower the bottles through the floor apertures into a receiving receptacle, means operatively coupled with said vertically movable means for effecting shifting of the floor to a second position to locate the openings beneath the bottles, the vertically movable means continuing its vertical movement to lower the bottles through the openings into the receptacle, and means in the path of movement of the vertically movable means to engage the latter and effect release of the lowered bottles from the vertically movable means.

3. In a bottle crating machine, a shiftable floor having two working positions, means over said floor providing a plurality of bottle receivers, said floor having openings for the passage of the bottle groups from each receiver, said openings being out of alinement with the receivers in the first working position of the floor, mechanism adjacent to each of the receivers and actuated by the bottles entering each receiver to limit to a desired number the bottles admitted to the receiver, a series of vertically shiftable units each movable downwardly into a receiver and each including a means for coupling a bottle therewith, means for effecting the downward movement of the units in two stages and for coupling the bottles with each unit at the termination of the first stage of its downward movement, means operating immediately subsequent to the coupling of the bottles to the units and before beginning the second stage of movement for moving the floor to its second working position to bring the openings into alinement with the receivers, the unit functioning during the second stage of downward movement to lower the bottles through the openings, and means actuated by engagement with a part of the machine lying beneath the units at the termination of the second stage of movement of the units for releasing the bottles from said coupling means.

4. In a bottle crating machine, a horizontal frame structure, a shiftable unit disposed within said frame structure and including a plurality of spaced parallel track rails, means forming a plurality of bottle receiving areas above said unit, each of said areas having a horizontal depth sufficient to receive a number of bottles in a row and each of said rails being disposed in the lower part of an area for the support of a row of bottles, an oscillatable member disposed at one side of each area at an end thereof to be engaged and oscillated by each bottle as it passes into the area through said end, a movable member disposed at the other end of each area to be engaged and shifted by the first introduced bottle after a predetermined number of bottles have been introduced into the area, mechanism operatively coupling said movable member with the oscillatable member of the adjacent area for effecting the locking of the oscillatable member against further oscillation after the said predetermined number of bottles has entered the area, means operating to grip the tops of the bottles after the areas are filled to effect lowering of the bottles between the rails, means operating immediately following the operation of the said top gripping means for effecting the shifting of the unit to remove said track rails from beneath the rows of bottles to permit the said lowering, means for shifting the movable member away from the bottles in contact therewith before the lowering of the bottles, and means for releasing the bottles from the lowering means.

5. In a bottle crating machine, a horizontal bottle supporting shiftable unit including a plurality of spaced track rails, means disposed above said unit providing a plurality of areas each extending lengthwise of a rail for the reception of a predetermined number of bottles in a row, said rows of bottles being run into the areas through an end of each upon the track rails, means in each area engaged and operated by one of the bottles of each row for closing the area against the admission of more bottles after the said predetermined number has been introduced, a plurality of vertically movable annular heads each designed to receive the top of a bottle and arranged and supported to be lowered into an area after the bottles have been grouped therein, to receive a bottle top, means carried by each head for gripping a row of bottles, as the head reaches a predetermined position in its downward movement, means operating after the gripping of the bottles for shifting said unit to remove the rails from beneath the rows of bottles whereby the rows of bottles may be lowered by the downwardly moving heads between the rails, a plurality of arm members movable with said heads between the bottles of each row and operating to space the bottles a predetermined distance apart to facilitate entrance of each bottle top into a head, means effecting the moving of the arms as the heads move downward and prior to the gripping of the bottles, and means for releasing the bottles from said gripping means at the completion of the lowering movement of the heads.

6. A bottle crating machine, comprising a movable support designed to have a predetermined number of bottles run thereonto in a row, a head unit member normally disposed in a position with respect to the support to clear the tops of a row of the bottles thereon, said head unit being supported for vertical reciprocation to be moved to a lowered position in close proximity to the support, means carried by the head unit providing a plurality of bottle top grippers corresponding in number to the bottles in the row, a vertically movable bottle shifter including a plurality of arms which are movable downwardly with and during a portion of the downward movement of said head unit to engage between and separate said bottles a predetermined distance apart for engagement by said grippers, means for shifting the bottle support, said support shifting means being made operative when the bottle gripping means are in engagement with the bottles, whereby the bottles may be lowered by the head unit past the support into a receiver, and means operating upon the movement of the head unit to the said lowermost position thereof for effecting the release of the bottles by the gripping means.

7. In a bottle crating machine, a shiftable support designed to have a predetermined number of bottles run thereonto in a row, a head disposed normally at an elevation to clear the bottles on the support and supported for downward movement to a low position in which it is in close proximity with the support, a plurality of bottle neck gripping units carried by the head and corresponding in number with the bottles in the row, means adapted to operate in sequence with the head for effecting the spacing apart of said bottles lengthwise of the row prior to the engagement of the necks by said gripping means, a plurality of trigger members carried by said head and adapted when actuated to release the engagement of the bottle neck gripping means from the bottle necks, means operating immediately following the gripping of the bottle necks for shifting the support from beneath the row of bottles to permit the bottles to be lowered by the head into receivers disposed beneath the support, and means arranged in the line of movement of said triggers to be engaged thereby upon movement of the head to the said lowered position thereof for effecting the release of the bottle necks by said gripper means.

8. A bottle crating machine, comprising a shiftable support designed to receive a predetermined number of bottles in a row, a vertically movable head having a fully raised position in which it is disposed at an elevation above a row of bottles on the support and having a fully lowered position in which it is in close proximity to the support, a plurality of bottle neck grippers carried by the head and corresponding in number with the bottles in said row and movable downwardly with the head for connection with the bottle necks, a plurality of spaced arms, means disposed above said head for supporting the spacer arms for vertical movement, certain of said arms being oscillatable into a position in which all of the arms are in vertical parallel relation, means for moving the oscillatable arms during the downward movement of the arms and of the head to effect the interpositioning of the arms between the bottles and the shifting of the bottles into spaced relation to be lowered past the support into a receiver, means for shifting said support when the bottle necks have been engaged by the gripper means to facilitate lowering the bottles into the receiver, and means functioning upon movement of the head to the said lower position to effect the release of the bottle necks by the grippers.

9. A bottle crating machine, comprising a movable supporting track rail onto which a predetermined number of bottles are run in a row, a vertically movable bar extending longitudinally of the row of bottles and supported for movement from an elevated position in which it is above the bottles to a lowered position in which it is in close proximity to the track rail, said bar having a series of openings corresponding in number with the bottles to receive the tops of the bottles, a shiftable gripper means enclosing each opening for engagement around the neck of the bottle as the neck passes through the opening to effect suspension of the bottle from the bar, release triggers for effecting the shifting of the gripper means for the release of the bottle neck, means for removing the bottle supporting track rail from beneath the bottles, said last means functioning immediately after the bottle neck gripping means have engagement with the bottle necks whereby the bottles may be lowered past the supporting rail into a receiver, and means disposed horizontally in the line of vertical movement of the triggers to be engaged by the triggers when the bar reaches its lower position to effect the disengagement of the bottle necks by the gripper means.

10. A bottle crating machine, comprising a shiftable support onto which a plurality of bottles are moved, control mechanism for limiting the number of bottles moved onto the support to a predetermined number, said bottles being initially disposed in a line in side by side contacting relation, a pair of elevators disposed in vertically spaced relation above the support, a head suspended from one of said elevators to be raised and lowered thereby, a plurality of bottle neck gripping units carried by the head, means carried by the other one of the elevators which moves downwardly between the bottles upon the lowering of the elevators and effects the shifting apart of the bottles to aline the tops thereof with said gripping units, the said other one of the elevators having a shorter extent of downward movement than the first elevator, means for shifting the support from beneath the bottles after the bottle necks are engaged by the gripping units to permit the bottles to be lowered past the support into a receiver, and means for effecting the release of the gripping units from the bottle necks which includes releasing triggers which are made operative by engagement with the bottle shifting means after the downward movement of the latter has stopped.

11. A bottle crating machine, comprising a shiftable support onto which a plurality of bottles are run in side by side relation to form a row, a pair of vertically spaced elevator plates disposed above the support and adapted to have coincidental and independent vertical movement, a head connected with one of said plates and having a normally raised position above the bottles on the support and a lowered position, a spacer arm secured to and extending downwardly from the other plate for extension between two adjacent bottles, downwardly extending spacer arms carried by the said other elevator plate and supported for oscillating movement longitudinally of the row of bottles and each adapted to enter between a pair of adjacent bottles, with the first arm, upon downward movement of the said other plate, means for effecting the oscillation of the oscillatable arms upon said downward movement of the other plate into a position substantially parallel with the first arm whereby the several arms shift the bottles apart a desired distance, gripper units carried by said head and movable downwardly therewith and with the first plate to effect connection of the bottles as a group with the head, means for checking the downward movement of the said other plate at a predetermined time before downward movement of the first plate is checked, means for shifting said support from under the bottles after the gripping units have connected the bottles with the head whereby the bottles may be lowered past the support into a receiver, and means functioning in cooperation with said spacing arms as a result of the continued downward movement of the first plate after the second plate is stopped to release the gripping units from the bottles.

12. A bottle crating machine, comprising a shiftable support onto which a plurality of bottles may be run, a head unit disposed over said support, vertical guide means for said head unit facilitating the raising and lowering of the same in a vertical path from a raised position directly over the bottles to a lowered position over and in proximity to the support, a fluid cushion raising and lowering means for said head unit, said fluid cushion means being exhausted to facilitate the lowering of the head unit, bottle neck gripper members carried by the head unit and each moving down around and engaging a bottle neck upon lowering the head unit to a predetermined position, fluid exhaustion means for effecting the momentary checking of the exhaustion of the fluid means at the moment of engagement of the gripper members with the bottle necks and subsequently continuing exhausting the fluid means for release of the checking means, means connected to and movable with the head unit in its downward movement for actuating the fluid exhaustion checking means, means for shifting said support immediately following the connection of the gripper members with the bottle necks whereby upon resumption of the exhaustion of the fluid means the bottles will be lowered by the head unit past the support into a receiver, and means for releasing the gripper members from the bottle necks when said head unit reaches its lowermost position.

13. A bottle crating machine, comprising a shiftable support onto which a plurality of bottles are run, vertical guides adjacent said support, a head connected with said vertical guides to be moved in a vertical path thereon from a position directly over the bottles on the support to a lowered position over and in close proximity to the support, a vertical fluid cylinder disposed adjacent the head and having a vertically reciprocable fluid actuating rod extending from the upper end thereof and operatively coupled with the head, the head being raised upon admission of fluid to the cylinder and lowered upon the exhaustion of fluid therefrom, a plurality of bottle neck gripping units carried by the head and arranged to receive and engage a bottle neck upon movement of the head downwardly by exhaustion of the fluid from the cylinder, means operating automatically upon engagement of the gripping units with the bottle necks to check and then continue the exhaustion of the fluid from the cylinder, means operating synchronously with the fluid checking means to shift the support from under the bottles when the fluid exhaustion is checked, and means operating upon movement of the head to its lowest position for releasing the gripping units from the bottle necks.

14. A bottle crating machine, comprising a horizontally shiftable support onto which a plurality of bottles are moved, a vertically movable structure disposed over said support and including a plurality of bottle neck gripping units designed to be moved from an elevated position to a lowered position in which they are in close proximity to the plane of the support, a vertical fluid cylinder supported adjacent said structure and having a fluid actuated rod connected with the structure whereby upon introduction of fluid into the cylinder the structure will be raised and upon exhaustion of the fluid from the cylinder the structure will be lowered, a fluid actuated means carried with said support for effecting the movement of the support, fluid lines connected with said cylinder and with said fluid actuating means, a control valve in the line leading to said cylinder, a control valve in the line leading to said fluid actuated means, a normally open check valve in the line leading from said cylinder, means controlled by said structure upon its downward movement during exhaustion of fluid from the cylinder for effecting the closing of the check valve, means operating to reopen the check valve immediately following its closing, said check valve being closed and reopened immediately after the gripping units have engaged the bottle necks, means actuating the valve in the line leading to the fluid operating means immediately after the check valve is closed to effect actuation of the fluid actuated means and the shifting of the support from beneath the bottles, and means operating upon movement of said bottle neck grippers to lowered position for release of the bottle necks from the grippers.

15. A bottle crating machine, comprising a movable support onto which a plurality of bottles are run in a row, means for controlling the number of bottles moved onto the support including a normally horizontally disposed reciprocable member against which one of the bottles is forced when a predetermined number have been moved onto the support whereby said reciprocable member is shifted from its normal position, said reciprocable member being mounted for oscillatory movement, means actuated by said member when the same is shifted from the said normal position for stopping the admission of more bottles to the support, a vertically movable unit normally disposed above the bottles on the support and movable downwardly to a lowered position in which it is adjacent the plane of the support, a plurality of bottle neck grippers carried by said unit for engaging the bottles upon the downward movement of the unit, means operating during the said downward movement of the unit for shifting said bottles apart to position them for engagement by said grippers, means operating synchronously with the movement of the unit to check the movement of said unit as the gripping elements engage the bottles and to shift said support from beneath the bottles whereby the bottles may be lowered by the unit past the support into a receiver, means for oscillating said reciprocable member away from the adjacent bottle as said unit lowers the bottles past the support to prevent damage by said member of wrappings on the adjacent bottle, and means for disengaging said grippers from the necks of the bottles when the unit reaches said lowered position.

16. In a bottle crating mechanism including a receiving area into which a predetermined number of bottles are entered in a row on a shiftable support disposed in the bottom of the area and mechanism operatively coupled with the support for shifting said support and for lowering the bottles as a group past the same into a crate, mechanism for controlling the number of bottles admitted to said area comprising a rock member mounted at one side of the receiving area at one end forming the entrance thereto to be engaged by and oscillated by each bottle as it enters the area, an oscillatable cam member supported adjacent the other end of the area, a reciprocable rod connected with said rock member to be given reciprocable movement with each oscillation of the rock member by a bottle, said cam member having an initial position adjacent an end of the rod to permit the rod to move the past the cam member, a reciprocable member disposed horizontally in said area adjacent the rear thereof to be engaged and moved rearwardly by a bottle when a predetermined number of bottles have been introduced into the area, and means operatively coupled with said reciprocable member for effecting the oscillation of said cam member when the member has been shifted rearwardly by the said predetermined number of bottles, into a position to check further reciprocation of the rod whereby said rock member is prevented from further movement and functions to check the admission of more bottles into the area.

17. In a bottle crating mechanism including a receiving area into which a predetermined number of bottles are entered in a row on a shiftable support disposed in the bottom of the area and mechanism for shifting said support and for lowering the bottles as a group past the same into a crate, mechanism for controlling the number of bottles admitted to said area comprising a rock member mounted at one side of the receiving area at the entrance thereto to be engaged by and oscillated by each bottle as it enters the area, an oscillatable cam member, a reciprocable rod connected with said rock member to be given reciprocable movement with each oscillation of the rock member by a bottle, said cam member having an initial position adjacent an end of the rod to permit the rod to move past the cam member, a reciprocable member disposed horizontally in said area adjacent the rear thereof to be engaged and moved rearwardly by a bottle when a predetermined number have been introduced into the area, and means connected with said reciprocable member for effecting the oscillation of said cam member when the member has been shifted rearwardly by the said predetermined number of bottles, into a position to check further reciprocation of the rod whereby said rock member is prevented from further movement and functions to check the admission of more bottles into the area, means for securing said reciprocable member after it has been shifted rearwardly by the bottles, and means for rocking said reciprocable member on an axis extending transversely thereof to effect the removal of the member from adjacent the bottle engaged thereby whereby said bottle may be moved downwardly past the said support without danger of damaging labels or wrappings through contact with the shiftable member.

18. A bottle crating mechanism comprising a shiftable support onto which a plurality of bottles may be run in a row, means forming an enclosing area in which the bottles are confined on the support, a rock member supported at one side of said area at the entrance thereto to be engaged and rocked by each bottle as it enters the area, a reciprocable rod connected with said rock member to be given reciprocable movement with each rocking motion of the member, an oscillatable member mounted adjacent an end of the reciprocable rod and having an initial position in which the rod when reciprocated moves past the member and a second position in which the oscillatable member checks the movement of the rod, an elongated reciprocable member supported at the rear of said area to be engaged at one end and shifted rearwardly by a bottle when a predetermined number have entered the area, means connected with said oscillatable member and controlled by the reciprocable member for holding the oscillatable member in its initial position before the reciprocable member is shifted and for releasing the oscillatable member for movement to its second position upon the shifting of the reciprocable member rearwardly, a unit supported for vertical movement above the support and adapted to move downwardly to a position adjacent the support, a plurality of grippers carried by the unit for coupling the bottles as a group with the unit to facilitate lowering the bottles past the support, means for shifting the support from beneath the bottles whereby the same may be lowered into a receiver, means operating to secure the reciprocable member in its rearwardly moved position, means operating to oscillate the reciprocable member to remove the forward end thereof from adjacent the engaged bottle, means for releasing the bottles from said unit when the latter is moved to a position adjacent the support, and means operating upon return of said unit to its raised position to release the reciprocable member for return movement forwardly, to reversely operate the reciprocable member to its horizontal position and to restore the oscillatable member to its initial position in which actuation of the rock member is permitted.

19. In a bottle crating machine including a shiftable support onto which a plurality of bottles are run in a row, a vertically shiftable mechanism movable from a raised position above the bottles to a lowered position adjacent the support and including means for coupling the bottles as a group thereto in its downward movement whereby the group of bottles may be lowered beneath the support when the latter is shifted, means for shifting the support, means for releasing the bottles from the mechanism when the latter has moved to its lowermost position, and means forming a receiving area into which the bottles enter, a mechanism for controlling the number of bottles introduced into said area on the support comprising a rocker member disposed at a side of the area for oscillation on a vertical axis and to be engaged and oscillated by each bottle as it enters the area, an eccentric connected with the rocker member, a rod connected with the eccentric and supported for reciprocable movement longitudinally of the area, a relatively long reciprocable member supported at the rear of the bottle receiving area for reciprocable movement, spring means normally urging said members forwardly to a predetermined position, the forward end of the member being arranged to be engaged by a bottle when a predetermined number has been moved into the area and to be forced rearwardly by the bottles against the tension of said spring, latching means for securing the reciprocable member when the same has been shifted rearwardly, an oscillatable finger disposed beneath the reciprocable member and maintained in one position thereby before the reciprocable member has been shifted, a body rockably supported adjacent the other end of said reciprocable rod and having an initial position in which it is out of the line of movement of the reciprocable rod and a second position in which it is rocked to block the movement of said rod, a link connection between said oscillatable finger and said rocking member through which the oscillatable finger maintains the rocking member in the said initial position while the reciprocable member maintains the finger in the said one position thereof, the reciprocable member when shifted releasing the rocking finger to oscillate to a second position and move said link for the rocking of the rock member to the said second position thereof.

20. A bottle crating machine, comprising a shiftable support, means forming an elongated bottle receiving area above the support into which a predetermined number of bottles may be introduced for maintenance in a row on the support, a vertically reciprocable unit having a raised position in which it is disposed at the top of said area and a lowered position in which it is disposed adjacent the support, means carried by said unit for coupling therewith the necks of a plurality of bottles in the area during the course of the downward movement of the unit, a fluid pressure means for maintaining the unit in raised position, said fluid pressure means being exhausted for the lowering of the unit, a fluid pressure actuated means for shifting said support, a shaft extending transversely of the rear of said area, a normally horizontal reciprocable member supported from said shaft and having an end extended into the area, said member being engaged by a bottle and shifted rearwardly upon the admission of a predetermined number of bottles into the area, a resilient means normally urging the reciprocable member forwardly, means for latching said reciprocable member when the same has been rearwardly shifted, a bottle admission control mechanism operatively coupled with said reciprocable member and functioning upon movement of the reciprocable member rearwardly to close the area against the admission of more bottles, fluid actuated means for rocking said shaft for the removal of the forward end of the reciprocable member from contact with the adjacent bottle, control means operating during the exhaustion of said fluid pressure means in the downward movement of the unit for effecting in timed relation the functions of checking the exhaustion of said fluid means at the moment of the connection of the bottles with said unit, actuating said fluid means for shifting the support from beneath the bottles, restarting the exhaustion of the fluid means and actuating the third mentioned fluid means for effecting the oscillation of the shaft, means for releasing the bottles from the unit at the end of the downward movement thereof, and means for restoring the reciprocable member to its horizontal position, and restoring the bottle control mechanism to its initial position for the admission of bottles to the area, upon return of the unit to its raised position.

21. A bottle crating machine, comprising a frame, a bottle support mounted on the frame to be shifted horizontally, means cooperating with said support for facilitating the grouping of a predetermined number of bottles thereon, a vertically reciprocable unit supported above the bottle support and having a raised position in which it is located above a group of bottles on the support and a lowered position adjacent the support, a fluid operated piston operatively coupled with said unit to raise the same to its raised position, means carried by said unit for gripping bottles on the support as a group in the downward movement of the unit, a fluid exhaust line leading from beneath the fluid actuated piston, a normally open valve in the exhaust line, a control valve for the exhaust line which, in one position, permits the fluid to be exhausted from said line, a fluid actuated means for effecting the shifting of the support from beneath the bottles, a control valve for admitting fluid to said actuated means for the operation of the latter, means coupled with said unit for effecting the closing of said normally open valve immediately that the gripping means functions to couple the bottles with the unit, means actuated by the downward movement of said unit for effecting the admission of fluid to said fluid actuated means and the shifting of said support from beneath the bottles when said valve is closed, means operated by and upon the downward movement of the unit for effecting the reopening of said normally open valve after the support is shifted whereby the unit may lower the bottles past the support into a receiving crate, and means for releasing the bottles from the unit when the unit reaches its lowest position.

22. A bottle crating mechanism according to Claim 21, including mechanism engaged and operated by the bottles as the same are moved onto the support for automatically governing the number of bottles received on the support, said bottle engaging mechanism being rockable to a position out of contact with the bottles prior to the lowering of the bottles by said unit past the support into the receiving crate, and means which is made operative by said unit in its downward movement for rocking the said bottle contacting mechanism away from the bottles simultaneously with the actuation of said support shifting means.

23. In a bottle handling machine including a vertically movable bottle lowering member having an aperture to receive a bottle neck, means for coupling the neck of a bottle with said member after said neck has passed through the aperture in the member, comprising two arcuate gripper bars disposed upon the top side of the member and extending across said aperture with their concave sides opposed, means pivotally coupling each bar with the member, said bars being swingable upwardly and outwardly from the opening on parallel axes, a release finger extending through and below the underside of the member and shiftably connected therewith, and means coupling said release finger with two adjacent ends of the bars for effecting the said upward and lateral relative swinging of the bars.

24. In a bottle handling machine including a vertically movable bottle lowering member having an aperture to receive a bottle neck, means for coupling the neck of a bottle with said member after said neck has passed through the aperture in the member, comprising two arcuate gripper bars disposed upon the top side of the member and extending across said aperture with their concave sides opposed, means pivotally coupling each bar with the member, said bars being swingable upwardly and outwardly from the opening on parallel axes, a release finger extending through and below the underside of the member and shiftably connected therewith, means coupling said release finger with two adjacent ends of the bars for effecting the said upward and lateral relative swinging of the bars, and a frusto-conical hollow guide having the frustrum secured in said aperture and extending downwardly from the underside of the member to facilitate movement of a bottle neck through the aperture between said bars.

25. A bottle crating machine, comprising a horizontally shiftable bottle support, means above the bottle support providing a receiving area into which a number of bottles may be introduced, a vertically movable unit above the bottle support and having a raised position adjacent the top of the area and a lowered position adjacent the bottle support, means for effecting the coupling with the unit in the course of its downward movement of the necks of the plurality of bottles on the support, a fluid actuated means for raising said unit to its raised position, the exhaustion of the fluid from the fluid actuated means permitting the unit to descend, a fluid actuated means for shifting the bottle support from beneath the bottles whereby the unit may lower the bottles past the bottle support, control mechanism associated with the several stated fluid actuated means for effecting in timed sequence the functions of checking the exhaustion of fluid from the second mentioned fluid operated means immediately subsequent to the connection of the bottle necks with said unit, for effecting the actuation of the actuating means for the bottle support and for restarting the exhaustion of fluid from the second mentioned fluid actuating means, and means for releasing the bottles from said unit when the unit reaches the said lowered position therefor.

26. A bottle crating machine, comprising a shiftably supported bottle support, means disposed over the support forming a bottle receiving area, a vertically shiftable unit above the bottle support and having a raised position in which it is adjacent the top of said area and a lowered position in which it is adjacent the bottle support, fluid means for raising and lowering the unit, means for automatically coupling a number of bottles on the bottle support as a group with said unit in the course of the downward movement of the unit, fluid actuated mechanism for effecting the shifting of said support from beneath the bottles whereby the latter may be lowered by the unit past the support into a crate, and mechanism controlled by said unit in the course of its downward movement for effecting in timed relation the functions of checking the fluid actuated means controlling the downward movement of the unit immediately after the connection of the bottles with the unit has been effected and causing continuation of operation of the last fluid actuated means and the downward movement of the unit and actuation of the fluid actuated support shifting mechanism for the removal of the support from beneath the bottles between the period of stopping and starting the downward movement of the unit, and means for effecting the release of the bottles from said unit when the unit reaches its lowered position.

27. In a bottle handling machine, a horizontally shiftable floor having a series of alined bottle passing openings therethrough to facilitate the lowering of bottles as a group through the floor to a lower position, means upon opposite sides of the series of openings and above the floor to form a receptacle for a series of bottles, the floor being in a position when the series of bottles is positioned in the receptacle with the openings to one side of the center of the receptacle, means for effecting the shifting of the floor, a head unit supported in the upper part of the receptacle for vertical movement, means for moving the head unit from a raised position downwardly to a lowered position in the receptacle and in close proximity to the floor, a series of bottle neck receiving openings in said head unit into which the necks of bottles enter at a period in the downward movement of the head unit, a pair of coacting gripping jaws disposed upon opposite sides of each bottle neck receiving opening of the head unit to engage around a bottle neck when the neck is extended through the head unit openings, a downwardly directed finger operatively coupled with each pair of jaws, a plurality of substantially U-shaped members supported for vertical movement with the head unit, each of said U-shaped members having a bottom horizontal bar, means for moving said U-shaped members downwardly between the bottles of a series disposed on the floor within the receptacle, certain of said U-shaped members being oscillatable, means for oscillating the oscillatable U-shaped members whereby the horizontal bars of each of the several U-shaped members will be equi-distantly spaced apart, the bar portions of the U-shaped members engaging the bottles to separate the bottles sufficiently to dispose the heads thereof in position for engagement by the bottle neck gripping means, and the said bar portions of the U-shaped members being disposed to be engaged by and to effect the actuation of said jaw releasing fingers when the head unit is moved into its lowermost position.

28. In a bottle handling mechanism including a vertically movable unit having a series of bottle neck receiving and gripping means, means for arranging a predetermined number of bottles beneath said unit comprising a floor, vertical spaced walls extending upwardly from the floor and forming with the floor an elongated receiving chamber into one end of which bottles may be successively introduced by suitable supplying means, a rock member supported at one side of the bottle receiving area at the entrance end thereof for the bottles, a member reciprocably supported within said receiver adjacent the opposite end thereof to be engaged by a bottle introduced into the receiver, the reciprocable member being shifted rearwardly by the bottles when a predetermined number has been introduced into the receiver, a locking means operatively coupled with the rock member at the entrance of the receiver for securing said rock member to prevent the entrance of additional bottles, and means under the control of the reciprocable member when the latter is actuated for setting said locking means.

29. A mechanism as set forth in claim 28 in which said reciprocable member is supported for rocking movement on an axis extending transversely of the bottle receiver and means for rocking the reciprocable member subsequent to the setting of said locking means to remove the reciprocable member from a bottle contacting therewith whereby the bottles in the receiver may be conveniently shifted as a group by said unit after connection with the unit by the neck gripping means.

30. In a bottle handling and arranging mechanism, a bottle receiver designed to receive a series of bottles in a row, means movable vertically into the receiver adapted to engage a row of bottles therein to shift the bottles as a group, and means for spacing the bottles apart lengthwise of the row to facilitate their connection with said means, comprising a series of vertically movable members each having a lower end portion adapted to be introduced between two adjacent bottles, and means for shifting certain of said vertically movable members in a direction lengthwise of the row of bottles after the lower end portions of the members have been introduced between the bottles whereby to separate the bottles to the necessary extent to facilitate their engagement by the said vertically movable means.

NORMAN G. CREAMER.